United States Patent
Ikeda et al.

(10) Patent No.: US 7,653,738 B2
(45) Date of Patent: *Jan. 26, 2010

(54) NETWORK MANAGEMENT METHOD, PROGRAM, AND SYSTEM

(75) Inventors: Yoshiro Ikeda, Kawasaki (JP); Akihiro Yasuo, Kawasaki (JP); Atsushi Mori, Kawasaki (JP); Akira Asato, Kawasaki (JP); Katsuhiko Nishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 407 days.

This patent is subject to a terminal disclaimer.

(21) Appl. No.: 11/476,650

(22) Filed: Jun. 29, 2006

(65) Prior Publication Data

US 2007/0214248 A1    Sep. 13, 2007

(30) Foreign Application Priority Data

Mar. 10, 2006 (JP) .............................. 2006-065692

(51) Int. Cl.
G06F 15/16 (2006.01)

(52) U.S. Cl. ..................................... 709/232

(58) Field of Classification Search ................. 709/223, 709/250, 232; 370/230, 232, 236, 244, 247, 370/360

See application file for complete search history.

(56) References Cited

U.S. PATENT DOCUMENTS

| 4,494,116 | A | 1/1985 | Tagami et al. |
| 5,065,161 | A | 11/1991 | Shibutani |
| 5,381,140 | A | 1/1995 | Kuroda et al. |
| 5,916,284 | A | 6/1999 | Ishihara et al. |
| 6,298,061 | B1 * | 10/2001 | Chin et al. .................. 370/400 |
| 2002/0120391 | A1 | 8/2002 | Nehls |
| 2003/0152087 | A1 * | 8/2003 | Shahoumian et al. ....... 370/401 |
| 2006/0259792 | A1 * | 11/2006 | Dove ........................... 713/300 |
| 2007/0211628 | A1 * | 9/2007 | Ikeda et al. ................. 370/230 |

FOREIGN PATENT DOCUMENTS

| JP | 2001-320415 | 11/2001 |
| JP | 2002-232427 | 8/2002 |

* cited by examiner

*Primary Examiner*—Krisna Lim
(74) *Attorney, Agent, or Firm*—Staas & Halsey

(57) ABSTRACT

An interconnection network is provided with switch devices for computers for a plurality of computers, respectively, a predetermined number of physical lines for switch devices for computers are bound to form each of logical lines, the physical lines forming the logical lines interconnect the other switch devices for computer via a plurality of switch devices for relay to form a parallel computer system. When a data transmission speed required between the computers is judged to be lower than a line transmission speed determined by the number of physical lines of any switch device for relay, switch setting-off unit turns off power of the whole switch device for relay that has been judged to shut off the switch device for relay from the interconnection network.

20 Claims, 22 Drawing Sheets

| MODE | REQUIRED DATA TRANSMISSION SPEED | SWITCH DEVICE FOR RELAY | | SWITCH DEVICE FOR COMPUTER | | | | | | | |
|---|---|---|---|---|---|---|---|---|---|---|---|
| | | 16-1 | 16-2 | 14-1 | | | | 14-2 | | | |
| | | | | P01 | P02 | P03 | P04 | P01 | P02 | P03 | P04 |
| 1 | LOWER THAN 1Gbps | ○ | × | ○ | × | × | × | ○ | × | × | × |
| 2 | 1Gbps OR HIGHER BUT LOWER THAN 2Gbps | ○ | × | ○ | ○ | × | × | ○ | ○ | × | × |
| 3 | 2Gbps OR HIGHER BUT LOWER THAN 3Gbps | ○ | ○ | ○ | ○ | ○ | × | ○ | ○ | ○ | × |
| 4 | 3Gbps OR HIGHER | ○ | ○ | ○ | ○ | ○ | ○ | ○ | ○ | ○ | ○ |

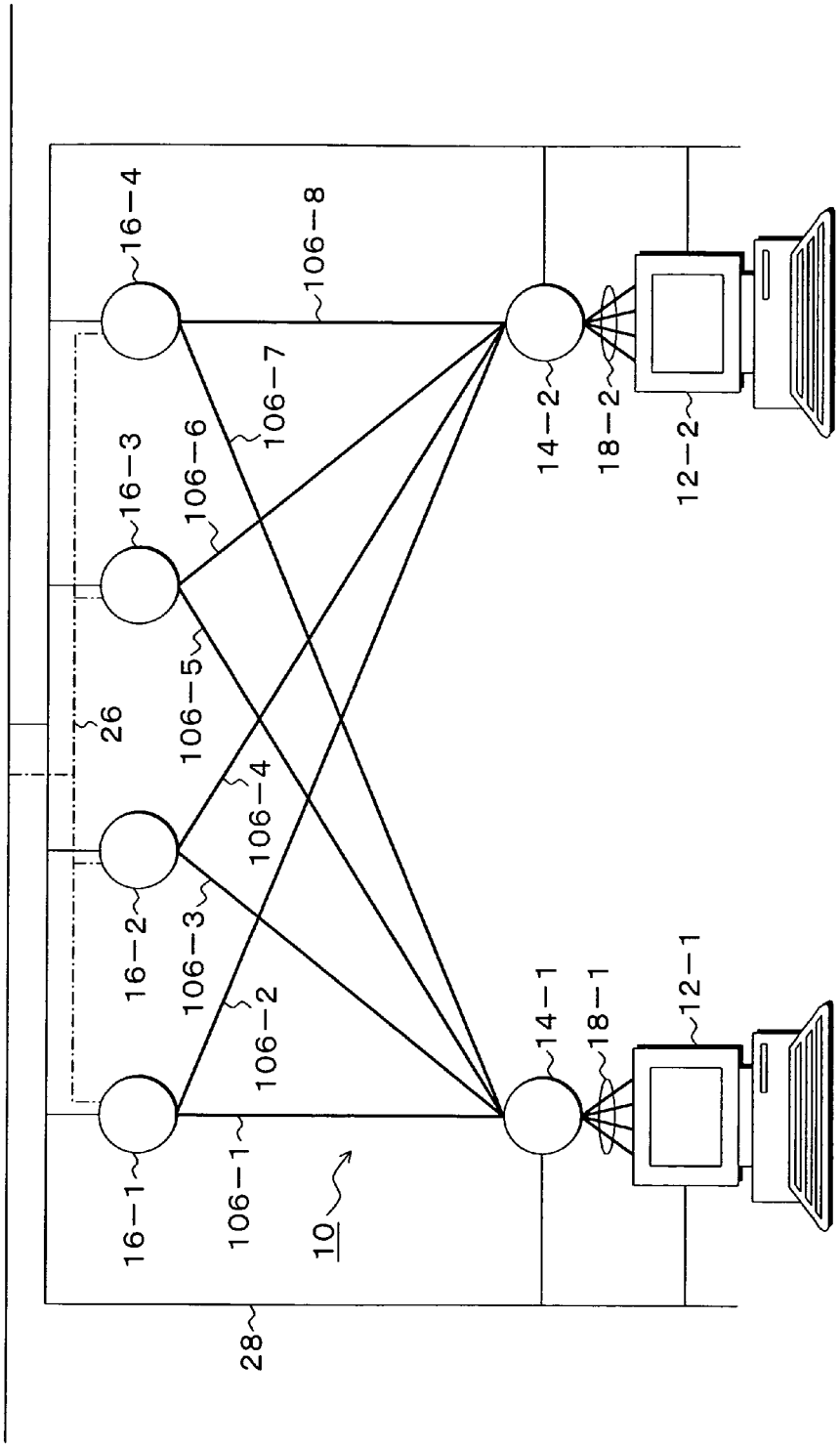

| MODE | REQUIRED DATA TRANSMISSION SPEED | SWITCH DEVICE FOR RELAY | | | |
|---|---|---|---|---|---|
| | | 16-1 | 16-2 | 16-3 | 16-4 |
| 1 | LOWER THAN 1Gbps | ○ | × | × | × |
| 2 | 1Gbps OR HIGHER BUT LOWER THAN 2Gbps | ○ | ○ | × | × |
| 3 | 2Gbps OR HIGHER BUT LOWER THAN 3Gbps | ○ | ○ | ○ | × |
| 4 | 3Gbps OR HIGHER | ○ | ○ | ○ | ○ |

| SWITCH DEVICE FOR COMPUTER | | | | | | | |
|---|---|---|---|---|---|---|---|
| 14-1 | | | | 14-2 | | | |
| P01 | P02 | P03 | P04 | P01 | P02 | P03 | P04 |
| ○ | × | × | × | ○ | × | × | × |
| ○ | ○ | × | × | ○ | ○ | × | × |
| ○ | ○ | ○ | × | ○ | ○ | ○ | × |
| ○ | ○ | ○ | ○ | ○ | ○ | ○ | ○ |

| MODE | REQUIRED DATA TRANSMISSION SPEED | SWITCH DEVICE FOR RELAY ||||
|---|---|---|---|---|---|
| | | 16-1 | 16-2 | 16-3 | 16-4 |
| 1 | LOWER THAN 1Gbps | ○ | × | × | × |
| 2 | 1Gbps OR HIGHER BUT LOWER THAN 2Gbps | ○ | ○ | × | × |
| 3 | 2Gbps OR HIGHER BUT LOWER THAN 3Gbps | ○ | ○ | ○ | × |
| 4 | 3Gbps OR HIGHER | ○ | ○ | ○ | ○ |

| SWITCH DEVICE FOR COMPUTER ||||||||||||||||||
|---|---|---|---|---|---|---|---|---|---|---|---|---|---|---|---|---|---|
| 14-1 |||| 14-2 |||| ... | 14-8 ||||
| P01 | P02 | P03 | P04 | P01 | P02 | P03 | P04 | ... | P01 | P02 | P03 | P04 |
| ○ | × | × | × | ○ | × | × | × | ..... | ○ | × | × | × |
| ○ | ○ | × | × | ○ | ○ | × | × | ..... | ○ | ○ | × | × |
| ○ | ○ | ○ | × | ○ | ○ | ○ | × | ..... | ○ | ○ | ○ | × |
| ○ | ○ | ○ | ○ | ○ | ○ | ○ | ○ | ..... | ○ | ○ | ○ | ○ |

NETWORK MANAGEMENT METHOD, PROGRAM, AND SYSTEM

This application is a priority based on prior application No. JP 2006-065692, filed Mar. 10, 2006, in Japan.

BACKGROUND OF THE INVENTION

1. Field of the Invention

The present invention relates to a network management method, a program, and a system that manage an interconnection network constructing a parallel computer system in which a plurality of computers are interconnected by switch devices, and more particularly to a network management method, a program, and a system for an interconnection network that enhances line transmission speed (band) by disguising a plurality of physical lines connecting switch devices mutually as one logical line by binding them.

2. Description of the Related Arts

Conventionally, a parallel computer system such as cluster system is constructed using an interconnection network (interconnect) that interconnects a number of computers via switch devices that has a line transmission speed in gigabit order. When the number of computers constructing a parallel computer system is large, it is often the case that a number of switch devices are used in an interconnection network (interconnect) connecting each computer and line transmission speed is enhanced by providing a plurality of lines between the switch devices and logically disguising them as one line so that the line transmission speed (bit rate bps) between the switch devices does not become a bottleneck. The technique in which a plurality of physical lines are bound and disguised logically as one line is called trunking (JP2002-232427). It should be noted that, since line transmission speed defined by bit rate (bps) has a relation that it is increased according to the band expansion of line, the line transmission speed is customarily expressed as line band, and, for example, the expression that line band is broadened (expanded) means line transmission speed becomes higher. Further, in a parallel computer system, many power conservation techniques are applied to components such as processor, memory, and hard disk drive that construct an individual computer. On the other hand, switch devices constructing a network connecting a plurality of computers are in an energized condition at all times and operated in a state that data transmission is always provided at the maximum data transmission speed determined by line transmission speed. Furthermore, as a mode to conserve power consumption of switch devices forming a network, a mode in which disabling and enabling of port function portion are carried out by monitoring arrival of packets is proposed (JA2001-320415).

However, in such a conventional interconnection network where trunking that a plurality of physical lines are disguised as one logical line by binding them is carried out, in many cases, time required for the maximum data transmission speed corresponding to a line transmission speed is short, time is mostly taken for communication at data transmission speed lower than a line transmission speed, and an excessive line communication speed is offered with respect to a required data transmission speed. For example, in JP2002-232427, the line transmission speed is enhanced by providing a plurality of physical lines between switches; however, even when the communication amount is small, the small amount of communication is intended to be uniformly allocated to a plurality of the physical lines, and therefore, the data transmission speed becomes lower with respect to the line transmission speed of the physical lines, which is wasteful. Nevertheless, since all the port portions are operated, power conservation cannot be expected. Further, the mode in JA2001-320415 that disabling and enabling of a port portion are carried out according to the monitoring of arrival of packets gives rise to a problem that, when a port portion is disabled, the network form is deformed because of the logical complete shutting-off of the lines, thereby giving a large side effect to the system.

SUMMARY OF THE INVENTION

According to the present invention to provide a network management method, a program, and a system that can dynamically provide a line transmission speed appropriate for data transmission speed by power-on or off of a whole switch device to reduce the power consumption in an interconnection network where trunking that a plurality of physical lines connecting the switch devices are bound and disguised as one logical line is carried out.

(Method)

The present invention provides a network management method. The present invention of which the network management method manages an interconnection network of a computer system where switch devices for computer are provided to a plurality of computers, respectively, a predetermined number of physical lines for the switch device for computer are bound to form a logical line, and the physical lines forming the logical line interconnect the other switch devices for computer via a plurality of switch devices for relay is characterized in that the network management method comprises a data transmission speed obtaining step in which a data transmission speed required among the computers is obtained;

a switch shutting-off step in which, when the data transmission speed required among the computers is judged to be lower than a line transmission speed determined by the number of physical lines for any switch device for relay, power of the whole switch device for relay that has been judged is turned off to shut off the switch device for relay from the interconnection network; and a switch resetting step in which, when a data transmission speed after the shutting-off is judged to be higher than the line transmission speed determined by the number of the physical lines for the switch device for relay in the shutting-off state, power-on control for the whole switch device for relay in the shutting-off state is instructed to allow the switch device for relay to return to the interconnection network.

Here, as the interconnection network, when a predetermined number of physical lines forming a logical line for a switch device for computer is divided into half and the physical lines connect to each other via switch devices for relay respectively, in the switch shutting-off step, when the data transmission speed required between the computers is judged to be lower than a line transmission speed determined by the half number of physical lines for either switch device for relay, power of the whole switch device for relay that has been judged is turned off to shut off the switch device for relay from the interconnection network, and in the switch resetting step, when a data transmission speed required between the computers after the shutting-off is judged to be higher than the line transmission speed determined by the half number of physical lines for a plurality of the switch devices for relay, power of the whole switch device for relay in the shutting-off state is turned on to allow the switch device for relay to return to the interconnection network.

Further, as the interconnection network, when each logical line for the number n of switch devices for computer provided corresponding to the computers is formed of the number m of physical lines and the number n of switch devices for computer are interconnected via the number m of switch devices for relay whose number corresponds to the number m of physical lines forming each of the logical lines, in the switch shutting-off step, every time when a data transmission speed required among the computers is judged to be lower than a line transmission speed for one line of the physical lines, power of the number m of the whole switch devices for relay each provided for every physical line is turned off according to a priority order to shut off the switch devices for relay from the interconnection network, and in the switch resetting step, every time when a data transmission speed required among the computers after the shutting-off is judged to be higher than the line transmission speed for one line of the physical lines, power of the whole switch devices for relay in the shutting-off state is turned on according to the reverse order to the priority order to allow the switch devices for relay to return to the interconnection network.

Furthermore, as the interconnection network, when each logical line for two switch devices for computer provided corresponding to the computers is formed of four physical lines and the two switch devices for computer are interconnected via four switch devices for relay whose number corresponds to the number four of physical lines forming each of the logical lines, in the switch shutting-off step, every time when a data transmission speed required between the computers is judged to be lower than a line transmission speed for one line of the physical lines, power of the four whole switch devices for relay each provided for every physical line is turned off according to a predetermined priority order to shut off the switch devices for relay from the interconnecting network, and in the switch resetting step, every time when a data transmission speed required between the computers after the shutting-off is judged to be higher than the line transmission speed for one line of the physical lines, power of the whole switch devices for relay in the shutting-off state is turned on according to the reverse order to the priority order to allow the switch devices for relay to return to the interconnection network.

Furthermore, as the interconnection network, when each of the logical lines for eight switch devices for computer provided corresponding to the computers is formed of the number four of physical lines and the eight switch devices for computer are interconnected via four switch devices for relay whose number corresponds to the number four of physical lines forming each of the logical lines, in the switch shutting-off step, every time when a data transmission speed required among the computers is judged to be lower than a line transmission speed for one line of the physical lines, power of the four whole switch devices for relay each provided for every physical line is turned off according to a predetermined priority order to shut off the switch devices for relay from the interconnecting network, and in the switch resetting step, every time when a data transmission speed required among the computers after the shutting-off is judged to be higher than the line transmission speed for one line of the physical lines, power of the whole switch devices for relay in the shutting-off state is turned on according to the reverse order to the priority order to allow the switch devices for relay to return to the interconnection network.

In the switch resetting step, power of a shared unit except for physical port units is preliminarily turned on with respect to a switch device for relay whose power is to be turned on next among the switch devices for relay being disabled, and when a data transmission speed required among the computers is judged to be higher than the line transmission speed for one line of the physical lines, power of the whole of the physical port units of the switch device for relay in which power of the shared unit has preliminarily been turned on is turned on to allow the switch device for relay to return to the interconnection network.

The network management method of the present invention is further provided with a port power control step in which a plurality of physical port units connecting physical lines that form a logical line for the switch device for computer are enabled or disabled by individual power-on or power-off to change the line transmission speed to a line transmission speed corresponding to a data transmission speed required among the computers.

The port power control step includes a port disabling step in which every time when a data transmission speed required among the computers is judged to be lower than a line transmission speed for one line of the physical lines, power of the physical port units each provided for every physical line is turned off according to a predetermined priority order for disabling; and a port enabling step in which every time when a data transmission speed required among the computers is judge to be higher than a line transmission speed for one line of the physical lines, power of the disabled physical port units is turned on according to the reverse order to the priority order for enabling.

In the data transmission speed obtaining step, a data transmission speed for the logical line for the switch device for computer is detected as a data transmission speed required among the computers.

In the data transmission speed obtaining step, a data transmission speed required among the computers is obtained from an estimated time schedule for data transmission speed created from the communication history storing data transmission speeds detected from logical lines for the switch devices for computer.

(Program)

The present invention provides a network management program. The present invention of which a computer of a network management apparatus manages an interconnection network of a parallel computer system where switch devices for computer are provided to a plurality of computers, respectively, a logical line is formed by binding a predetermined number of physical lines for the switch device for computer, the physical lines forming the logical line interconnect the other switch devices for computers via a plurality of switch devices for relay is characterized in that the computer is allowed to execute a data transmission speed obtaining step in which a data transmission speed required among the computers is obtained;

a switch shutting-off step in which, when the data transmission speed required among the computers is judged to be lower than a line transmission speed determined by the number of physical lines for any switch device for relay, power of the whole switch device for relay that has been judged is turned off to shut off the switch device for relay from the interconnection network; and a switch resetting step in which, when a data transmission speed after the shutting-off is judged to be higher than the line transmission speed determined by the number of physical lines for the switch device for relay in the shutting-off state, power of the whole switch device for relay in the shutting-off state is turned on to allow the switch device for relay to return to the interconnection network.

(System)

The present invention provides a network management system. The network management system of the present invention comprises an interconnection network of a parallel computer system in which switch devices for computer are provided to a plurality of computers, respectively, each logical line is formed by binding a predetermined number of physical lines for the switch device for computer, and the physical lines forming the logical line interconnect the other switch devices for computer via a plurality of switch devices for relay; and a network management apparatus that manages the interconnection network, where the network management apparatus is provided with a data transmission speed obtaining unit that obtains a data transmission speed required among the computers;

a switch shutting-off unit that turns off power of a whole switch device for relay that has been judged to shut off the switch device for relay from the interconnection network when the data transmission speed required among the computers is judged to be lower than a line transmission speed determined by the number of physical lines for any switch device for relay; and a switch resetting unit that turns on power of the whole switch device for relay in the shutting-off state to allow the switch device for relay to return to the interconnection network when a data transmission speed after the shutting-off is judged to be higher than the line transmission speed determined by the number of the physical lines for the switch device for relay in the shutting-off state.

According to the present invention, with respect to the interconnection network of the a parallel computer system in which switch devices for computer provided to a plurality of computers respectively are interconnected via a plurality of switch devices for relay, when a data transmission speed required among the computers is judged to be lower than the total of line transmission speeds of all physical lines connecting to a switch devices for relay, power of the whole switch device for relay that has been judged is turned off, thereby reducing the line transmission speed to eliminate waste, which makes it possible to suppress the power consumption to the required minimum. Further, even though power of the whole switch device for relay is turned off, the switch device for computer is connected via the other switch devices for relay connecting with the rest of the physical lines that form the logical line, and therefore, the logical line is not shut off and no disadvantage that the network form is changed does occur. Furthermore, when power of a plurality of whole switch devices for relay is sequentially turned off to shut off according to a predetermined priority order in accordance with a reduction in required data transmission speed and then when a required data transmission speed is increased, power of the whole switch devices for relay is sequentially turned on according to the reverse order to the priority order at the time of the power turning-off. In this case, a time lag when the switch device for relay is allowed to return to the interconnection network is reduced to a time lag when power of only physical port units is turned on by means of turning on power of the shared processing unit in advance except for the physical port units for a switch device for relay that is to be turned on next, and it is possible to reduce the time taken to return to the interconnection network by power-on of the whole switch device to the required minimum. For example, when power of the whole switch device including the shared processing unit is turned on, it takes over ten seconds because initialization of the processor housed in the switch device is accompanied. However, only for the physical port units, it takes about one micro second, thereby making it possible to carry out shutting-off and resetting to the interconnection network following power-on and off of the whole switch device at high speed. The above and other objects, features, and advantages of the present invention will become more apparent from the following detailed description with reference to the drawings.

BRIEF DESCRIPTION OF THE DRAWINGS

FIG. 2 is a detailed diagram to explain a switch control table used in the embodiment of FIG. 1;

FIGS. 10A and 10B are detailed diagrams to explain the parallel computer system representing another embodiment of the present invention;

FIG. 11 is a detailed diagram to explain the switch control table used in the embodiment of FIGS. 10A and 10B;

FIG. 16 is a detailed diagram to explain the switch control table used in the embodiment of FIGS. 15A and 15B;

DETAILED DESCRIPTION OF THE PREFERRED EMBODIMENTS

Figure 1:
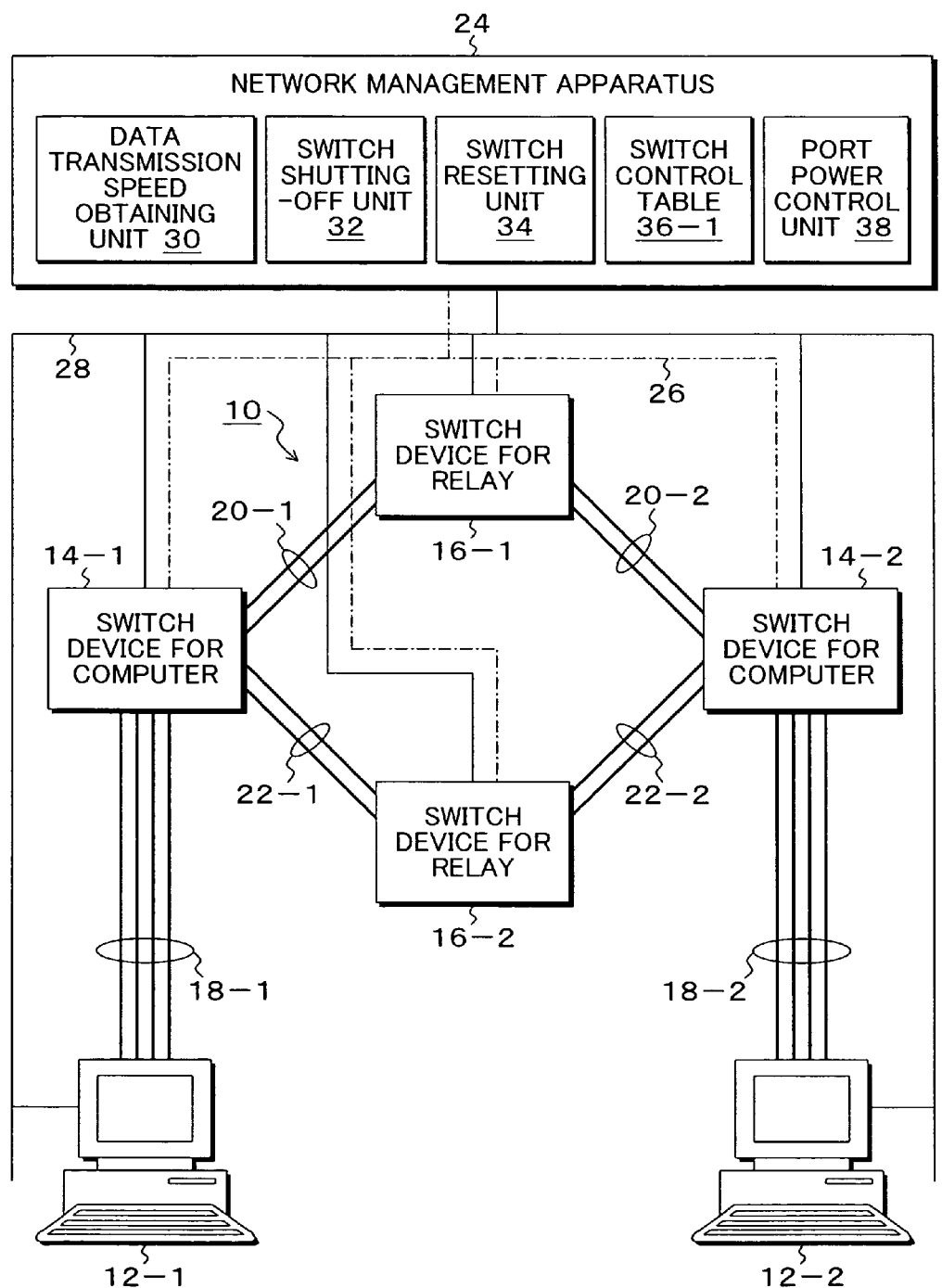
FIG. 1 is a detailed diagram to explain a parallel computer system representing one embodiment of the present invention.

FIG. 1 is a detailed diagram to explain a parallel computer system representing one embodiment of the present embodiment. In FIG. 1, an interconnection network 10 forming a parallel computer system interconnects two computers 12-1 and 12-2 in the present embodiment. To the interconnection network 10, switch devices for computer 14-1 and 14-2 are provided corresponding to the computers 12-1 and 12-2, and switch devices for relay 16-1 and 16-2 interconnect the switch devices for computer 14-1 and 14-2, respectively. Here, logical lines 18-1 and 18-2 each of which is formed of four physical lines bound into a bundle connect the computers 12-1 and 12-2 to the switch devices for computer 14-1 and 14-2. On the other hand, the switch devices for computer 14-1 and 14-2 are connected to each other by half logical lines 20-1 and 20-2 each using two physical lines via the switch device for relay 16-1 and also connected to each other by half logical lines 22-1 and 22-2 each using two physical lines via the other switch device for relay 16-2. Line speeds of the physical lines for the switch devices for computer 14-1 and 14-2 and the switch devices for relay 16-1 and 16-2 are uniquely defined by the transmission clocks used in each switch device. In order to simplify the explanation in the present embodiment, a line transmission speed per one physical line is set to 1 Gbps. Owing to this, since the logical lines 18-1 and 18-2 are formed of four physical lines, respectively, each line transmission speed is 4 Gbps. Since the half logical lines 20-1, 20-2, 22-1, and 22-2 are formed of two physical lines, respectively, via the switch devices for relay 16-1 and 16-2, each line transmission speed is 2 Gbps. To the switch devices of the interconnection network 10 forming the parallel computer system in this way, a network management apparatus 24 is provided. The network management apparatus 24 is connected to the computers 12-1 and 12-2, the switch devices for computer 14-1 and 14-2, and the switch devices for relay 16-1 and 16-2 by a local area network (LAN) 28 and is designed to be capable of obtaining a data transmission speed associated with data packet transmission by respective switch devices. With respect to the switch device for relay 16-1 and 16-2, a power line 26 is connected from the network management apparatus 24 and the network management apparatus 24 can control power-off or power-on of the switch devices for relay 16-1 and 16-2 as a whole unit. Note that, with respect to the switch devices for computer 14-1 and 14-2, power supply is carried out independently in a fixed manner and power-on and off are not carried out by the network management apparatus 24. The network management apparatus 24 is provided with a data transmission speed obtaining unit 30, a switch shutting-off unit 32, a switch resetting unit 34, a switch control table 36, and a port power control unit 38. The data transmission speed obtaining unit 30 obtains a data transmission speed required between the computers 12-1 and 12-2. Specifically, the number of data packets transmitted through the logical lines 18-1 and 18-2 is counted by a counter in each of the switch devices for computer 14-1 and 14-2, and a practical transmission speed can be obtained based on this number of counted packets. Further, with respect to obtaining a data transmission speed, besides obtaining a practical data transmission speed by the packet counter, data transmission speeds of the packet counts obtained from the logical lines 18-1 and 18-2 of the switch devices for computer 14-1 and 14-2 are cataloged in a history table, an estimated time schedule of data transmission speeds is created from the communication history of this history table, and then a required data transmission speed may be obtained from the estimated time schedule. When a required data transmission speed between the computers 12-1 and 12-2 is judged to be lower than a line transmission speed determined by the number of physical lines of the switch devices for relay 16-1 and 16-2, that is, the line transmission speed of 2 Gbps determined by the half logical lines 20-1 and 20-2, and 22-1 and 22-2 that make use of two physical lines, respectively, in the present embodiment, the switch shutting-off unit 32 turns off power of the whole device of either one of the switch devices for relay 16-1 and 16-2 according to a predetermined priority order of the two switch devices for relay 16-1 and 16-2 to shut off the switch device for relay from the interconnection network 10. After either of the switch devices for relay 16-1 and 16-2 is shut off and when the data transmission speed is judged to be higher than the line transmission speed determined by the number of physical lines of the switch device for relay in the shutting-off state, that is, 2 Gbps, the switch resetting unit 34 turns on power of the whole switch device for relay in the shutting-off state to allow the switch device for relay to return to the interconnection network 10. Such shutting-off by power-off or resetting by power-on of the switch devices for relay 16-1 and 16-2 by means of the switch shutting-off unit 32 and the switch resetting unit 34, respectively, is carried out with reference to the switch control table 36-1.

FIG. 2 is a detailed diagram to explain the switch control table 36-1 used in the embodiment of FIG. 1. In FIG. 2, the switch control table 36-1 is composed of items of required data transmission speed between the computers 12-1 and 12-2, switch device for relay, and switch device for computer. Required data transmission speed is classified into the following modes 1 to 4 using, as thresholds, the line transmission speeds when the number of physical lines forming the logical line 18-1 that connects the switch devices for computer 14-1 and 14-2 to the computers 12-1 and 12-2 respectively, that is, the number of four physical lines is sequentially changed.

Figure 3:
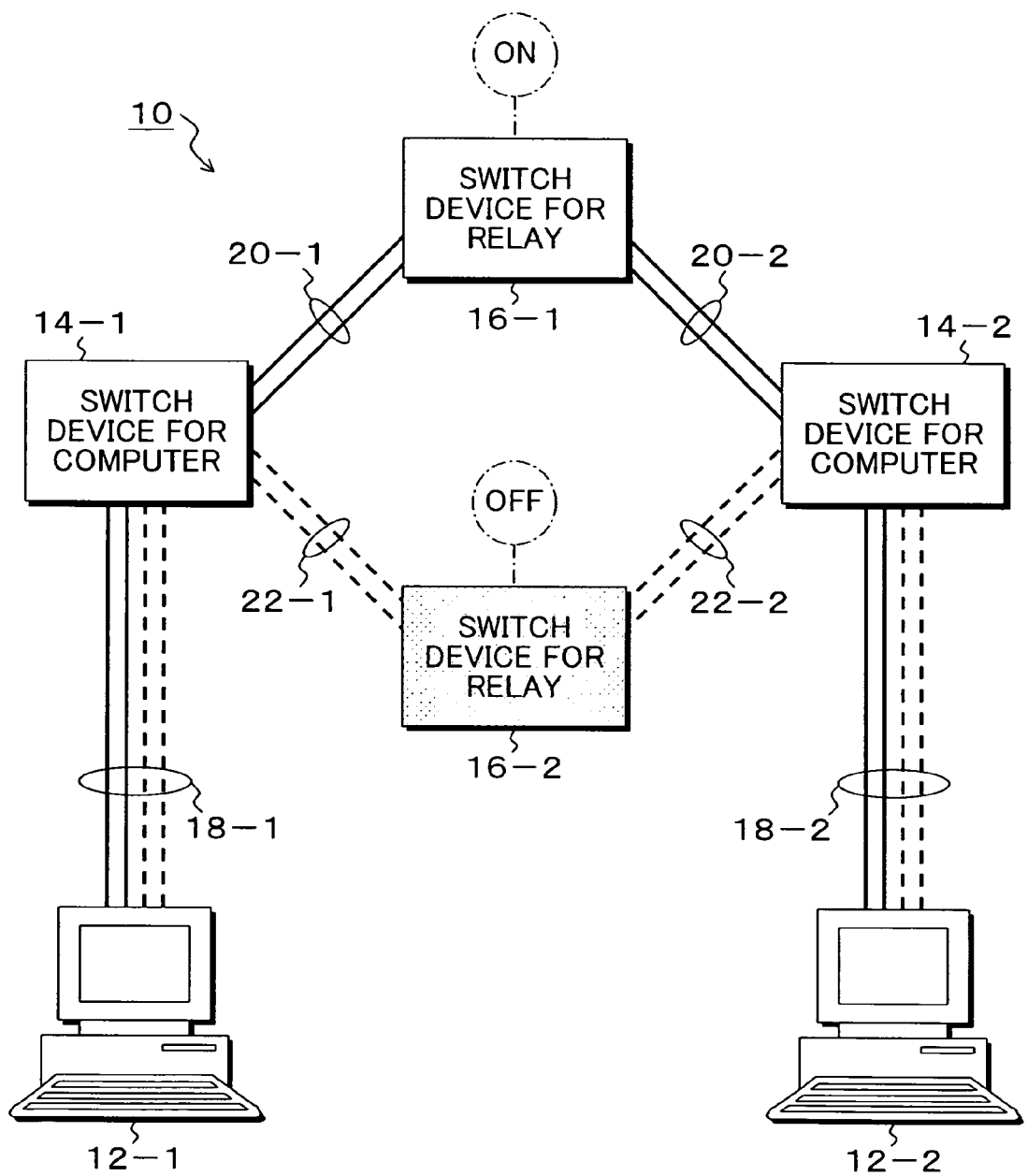
FIG. 3 is a detailed diagram to explain switch devices according to the present embodiment in a case where a required data transmission speed is reduced.

Mode 1: lower than 1 Gbps
Mode 2: 1 Gbps or higher but lower than 2 Gbps
Mode 3: 2 Gbps or higher but lower than 3 Gbps
Mode 4: 3 Gbps or higher In the column of switch device for relay, the switch devices for relay 16-1 and 16-2 are listed. Further, in the column of switch device for computer, the switch devices for computer 14-1 and 14-2 are listed. In the column of switch device for relay, power control patterns of power-on shown by O mark and power-off shown by X mark corresponding to the modes 1 to 4 of required data transmission speed are catalogued. In the power control patterns, when a required transmission speed is in the mode 1 and mode 2, that is, when the speed is lower than 2 Gbps, the switch device for relay 16-1 is controlled to stay in power-on and the switch device for relay 16-2 is controlled to stay in power-off. In this state, as shown in FIG. 3, the data transmission speed required for the logical lines 18-1 and 18-2 for the computers 12-1 and 12-2 is lower than 2 Gbps and two physical lines of the four physical lines can deal. In this case, since one of the two switch devices for relay 16-1 and 16-2 that connect the switch devices for computer 14-1 and 14-2 can handle, a line speed of 2 Gbps can be secured by, for example, turning off power of the switch device for relay 16-2 to shut it off from the interconnection network 10 and turning on power of the switch device for relay 16-1. Accordingly, when a data transmission speed required between the computers 12-1 and 12-2 is low, the power consumption in the interconnection network 10 can be reduced by turning off power of one switch device for relay 16-2 as a whole unit in the interconnection network 10. When the data transmission speed between the computers 12-1 and 12-2 is judged to be getting close to the upper limit of 2 Gbps of the mode 2 of FIG. 2 after the switch device for relay 16-2 is shut off by power-off, power of the switch device for relay 16-2 is turned on to allow the switch device for relay to return to the interconnection network 10. Again referring to FIG. 1, the port power control unit 38 provided to the network management apparatus 24 enables or disables a plurality of physical port units connecting the physical lines provided to the switch devices for computer 14-1 and 14-2 by turning power on or off individually and carries out power control that changes the line transmission speed to a line transmission speed corresponding to the data transmission speed required between the computers 12-1 and 12-2.

In other words, in FIG. 3, when the data transmission speed between the computers 12-1 and 12-2 is reduced to 2 Gbps or lower and power of the switch device for relay 16-2 is turned off in association with the reduction, two physical lines forming the half logical lines 22-1 and 22-2, respectively, are disabled as shown by the dotted lines. Owing to this, with respect to the switch devices for computer 14-1 and 14-2, the line transmission speed through two physical lines among the four physical lines forming the logical lines 18-1 and 18-2 becomes unnecessary. Thus, in association with the power-off of the switch device for relay 16-2, power of the physical port units connecting the two unnecessary physical lines of the logical line formed of four physical lines in the switch devices for computer 14-1 and 14-2 is turned off to disable. In FIG. 3, in association with the power-off of the switch device for relay 16-2, the half logical lines 22-1 and 22-2 and two physical lines of the logical lines 18-1 and 18-2 connecting the sides of the computers 12-1 and 12-2, respectively, in the switch devices for computer 14-1 and 14-2 are disabled by power-off of the physical port units as shown by the dotted lines, thereby reducing the power consumption of the switch devices for computer 14-1 and 14-2 at the same time. In the power control of the physical port units inside the switch devices for computer 14-1 and 14-2 by this port power control unit 38, disabling and enabling of the physical lines are performed by four physical port units shown in the columns of switch devices for computer 14-1 and 14-2 on the right side of the switch control table 36-1 in FIG. 2, that is, P01 to P04 with the use of the port power control patterns shown by power-on with O marks and power-off with X marks that are determined depending on the modes 1 to 4 of a required data transmission speed 100.

Figure 4:
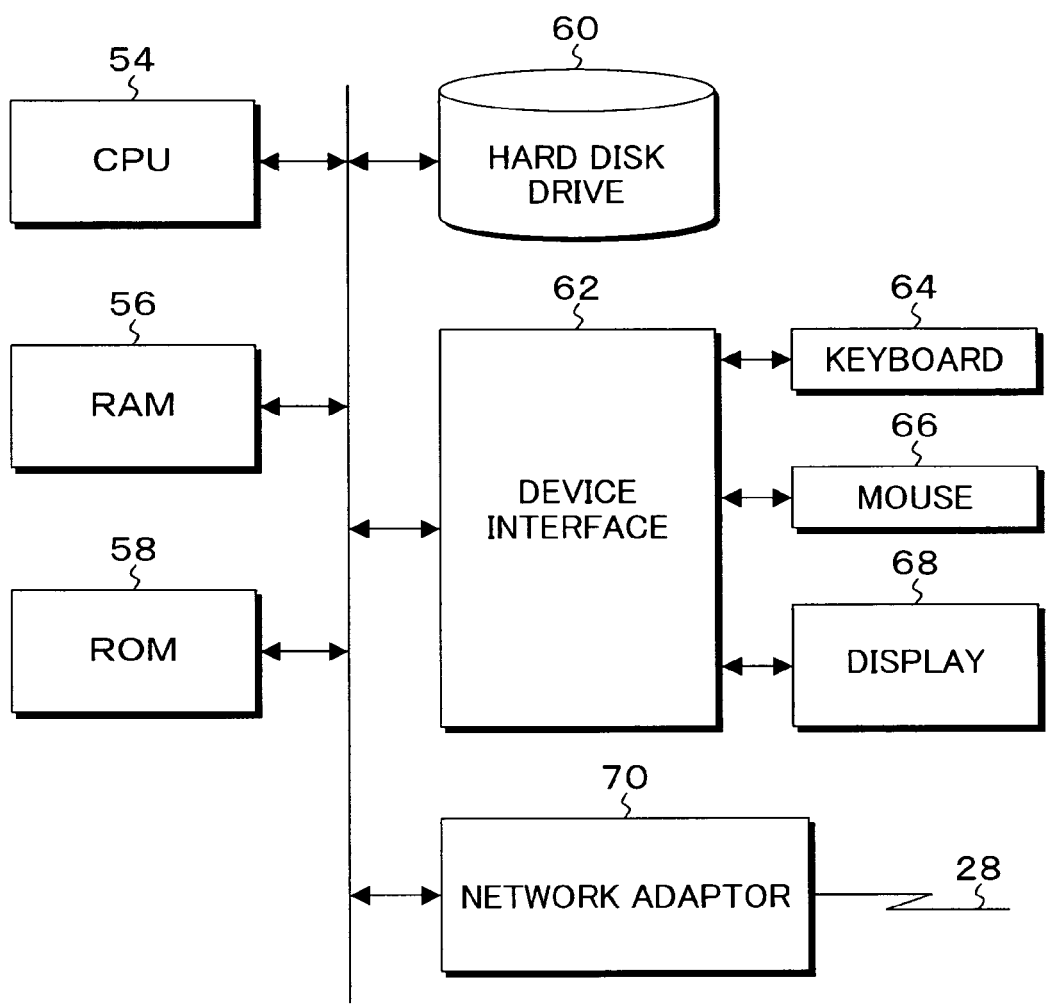
FIG. 4 is a block diagram of hardware environment of a computer that executes a program for a network management apparatus of the present embodiment.

FIG. 4 is a block diagram of hardware environment of the computer that executes a program for the network management apparatus 24 of the present embodiment. In FIG. 4, with respect to a central processing unit (CPU) 54, a read on memory (ROM) 56, a random access memory (RAM) 58, a hard disk drive 60, a device interface 62 connected to a keyboard 64, a mouse 66, and a display 68, and further a network adaptor 70 are connected via bus. A network management program of the present embodiment is stored in the hard disk drive 60. After boot-up and initialization of the computer and sequential development of read-out of operation system (OS) with respect to the RAM 56, the network management program is read out from the hard disk drive 60, stored in the RAM 56, and executed by the CPU 54.

Figure 5:
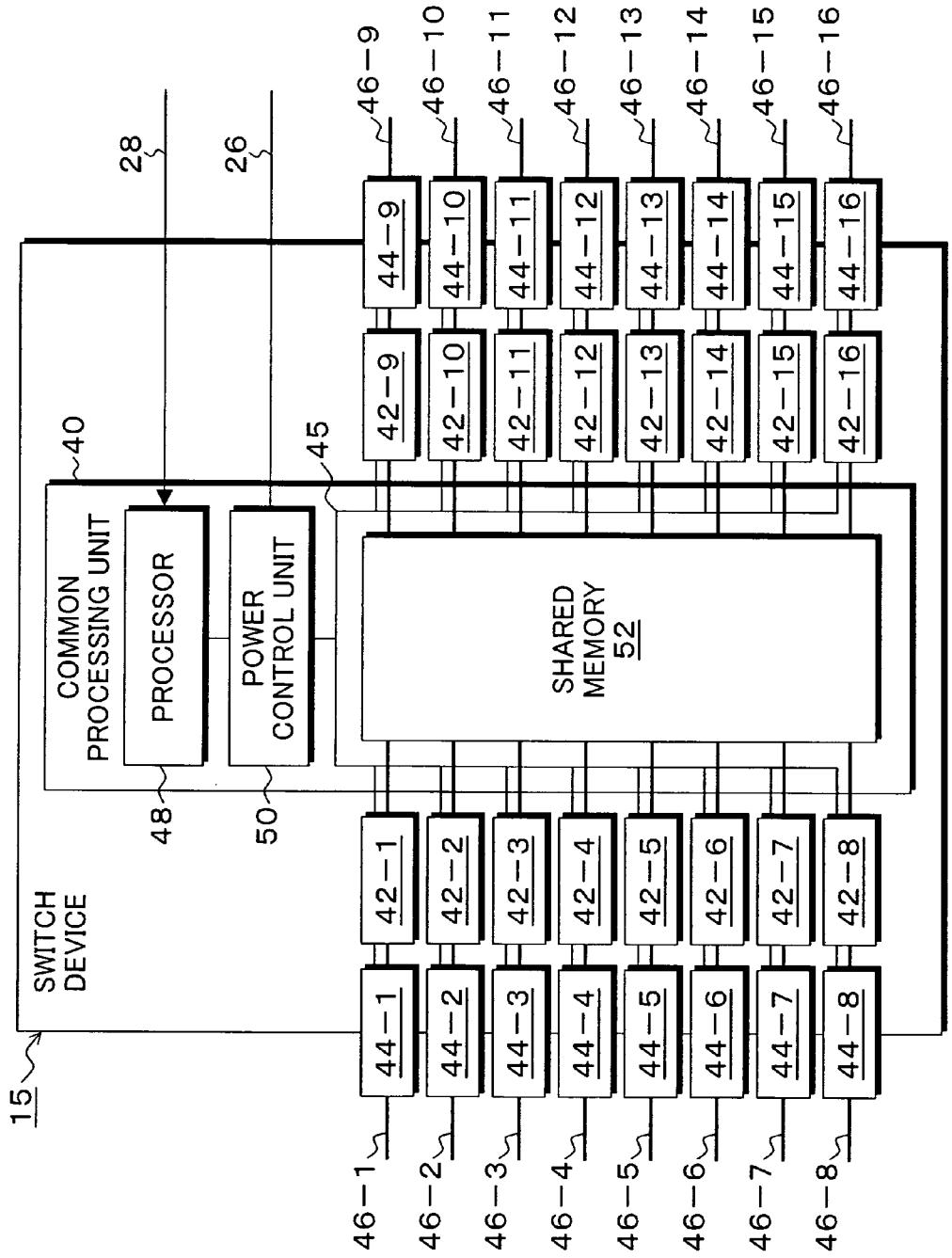
FIG. 5 is a block diagram of a circuit configuration of a switch device for relay in the present embodiment.

FIG. 5 is a detailed diagram to explain the switch device according to the present embodiment by taking it out. In FIG. 5, a switch device 15 is manufactured as a semiconductor integrated circuit or a circuit board incorporated in a housing, 16 physical port units 42-1 to 42-16 are provided with respect to a common processing unit 40, optical modules are connected as external port units 42-1 to 42-16 in the present embodiment, and optical fiber lines drawn out from the external port units 44-1 to 44-16 form physical lines 46-1 to 46-16. The common processing unit 40 is provided with a processor 48, a power control unit 50, and a shared memory 52. Firmware that can individually control the physical port units 42-1 to 42-16 and the external port units 44-1 to 44-16 using the optical modules is incorporated in the processor 48. The power control unit 50 carries out power supply to the physical port units 42-1 to 42-16 and the external port units 44-1 to 44-16 via power lines 45 and can individually control on and off of power supply with respect to each port unit, thereby enabling the physical lines by power-on or disabling the physical lines by power-off. The shared memory 52 carries out mutual data transfer among the physical port units 42-1 to 42-16 with the use of, for example, first-in first-out (FIFO) function. The function of the shared memory 52 can be substituted with a cross bar.

Figure 6:
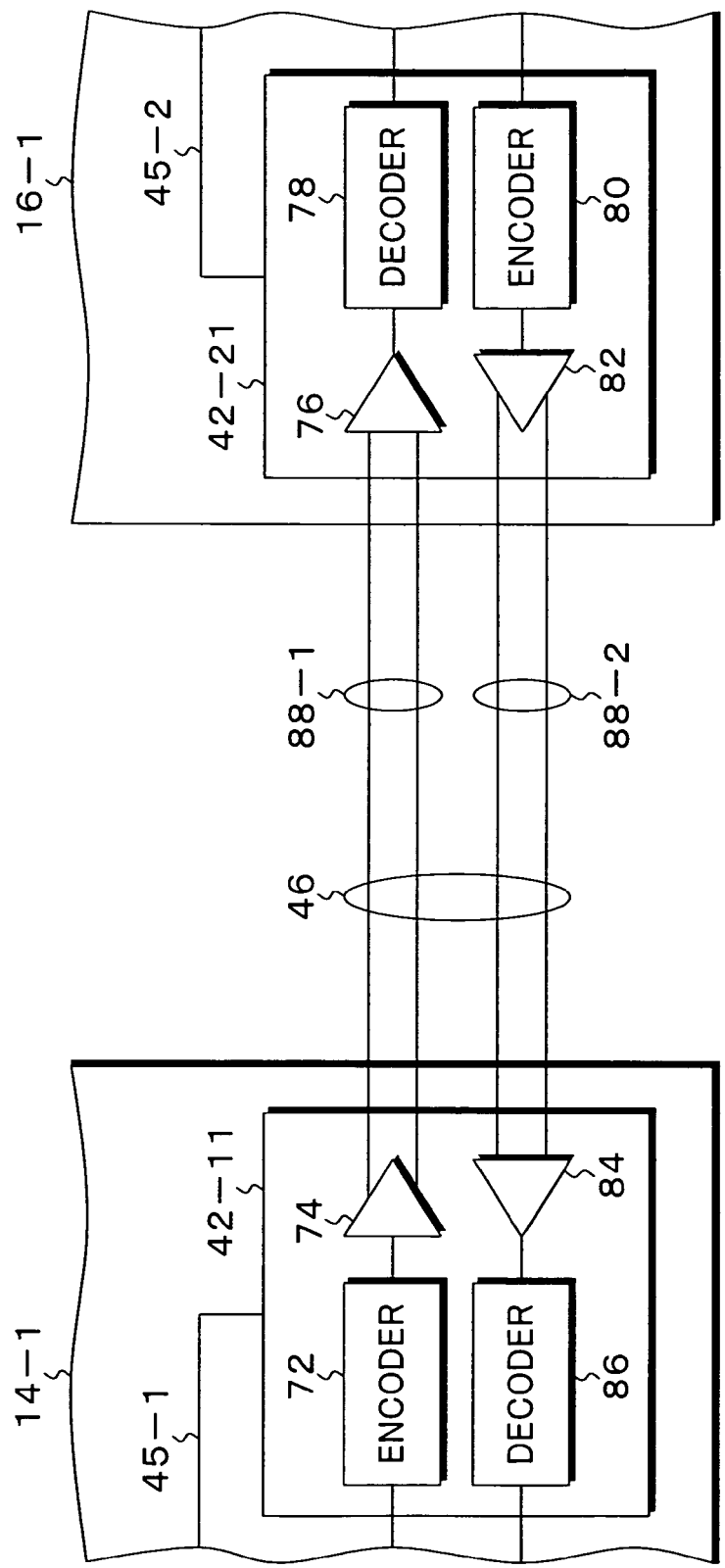
FIG. 6 is a detailed diagram to explain control processing of the switch device for relay in the embodiment of FIG. 1.

FIG. 6 is a detailed diagram to explain the physical port unit and the physical lines in the switch device of the present embodiment, and the network connection between the switch devices 14-1 and 16-1 of FIG. 1 is take out. In FIG. 6, the switch device 14-1 is provided with the physical port unit 42-11, and the physical port unit 42-11 is provided with an encoder 72, a driver 74, a receiver 84, and a decoder 86, and enabling or disabling is performed by on or off of power supply via a power line 45-1. Similarly, the switch device 16-2 is provided with a physical port unit 42-21, and the physical port unit 42-21 is provided with a receiver 76, a decoder 78, an encoder 80, and a driver 82. The driver 74 of the physical port unit 42-11 is connected to the receiver 76 of the switch device 16-1 via a balanced line 88-1. The driver 82 of the switch device 16-1 is connected to the receiver 84 of the switch 14-1 via a balanced line 88-2. These two balanced lines 88-1 and 88-2 are usually called a lane, and one lane forms a physical line 46. The encoders 72 and 80 provided to the physical port units 42-11 and 42-21, respectively, convert serial bit strings transmitted with packet communication to, for example, 8 bits/10 bits. Further, the decoders 78 and 86 convert serial bit data received by the receivers 76 and 84, respectively, to 10 bits/8 bits to return to the originals. Such a line transmission speed of the physical line 46 via the physical port units 42-11 and 42-21 is determined by a clock speed at which the physical port units 42-11 and 42-21 are operated, and, for example, a line transmission speed of 1 Gbps (bit rate) is obtained.

Figure 7:
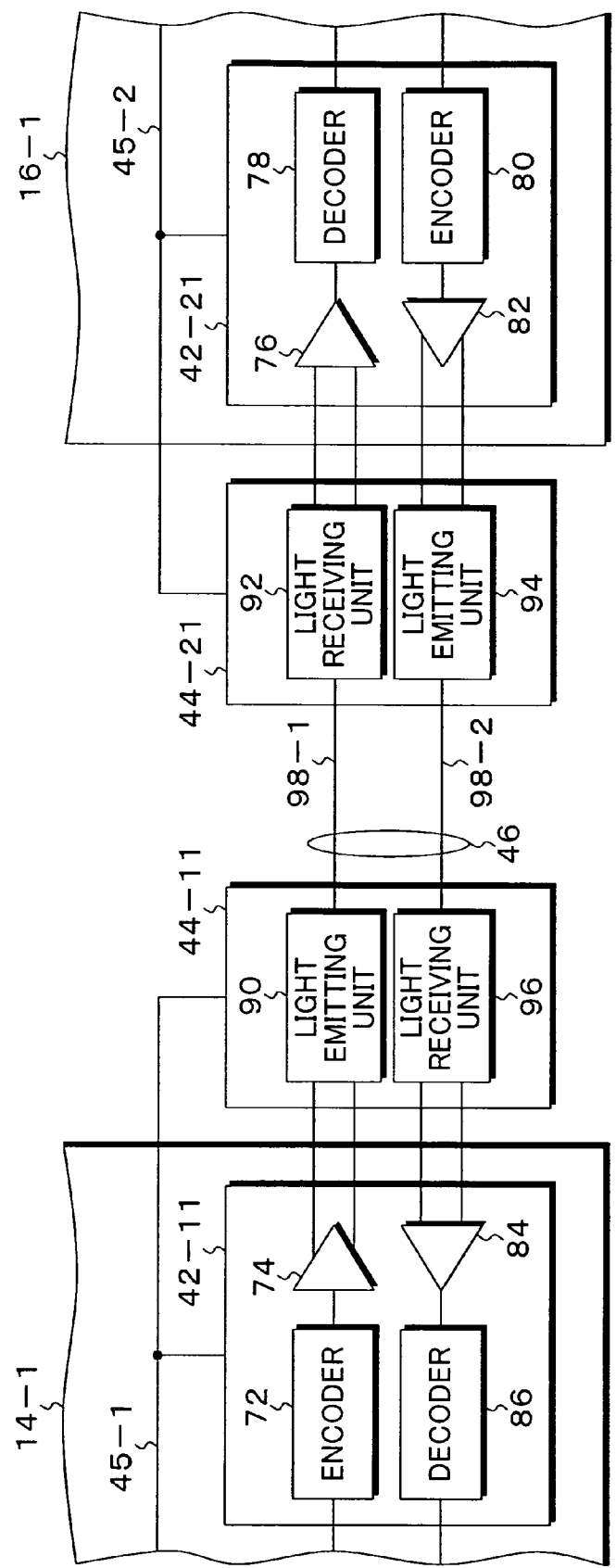
FIG. 7 is a detailed diagram to explain physical port units and physical lines in the switch devices provided with external port units.

FIG. 7 is a detailed diagram to explain the physical port units and the physical lines in the switch devices provided with external port units, respectively. In FIG. 7, the external port units 44-11 and 44-21 composed of optical modules are connected to the outsides of the physical port units 42-11 and 42-21 of the switch devices 14-1 and 16-1 of FIG. 5, respectively. The external port units 44-11 and 44-21 are provided with light emission units 90 and 94 and light receiving units 92 and 96, respectively. Optical fiber lines 98-1 and 98-2 connect therebetween, respectively, and the physical line 46 is formed of optical fiber lines 98-1 and 98-2. To the external port units 44-11 and 44-21, the power lines 45-1 and 45-2 are connected from the switch devices 14-1 and 16-2, and control of on and off of power supply is carried out simultaneously with the physical port units 42-11 and 42-21.

Figure 8A:
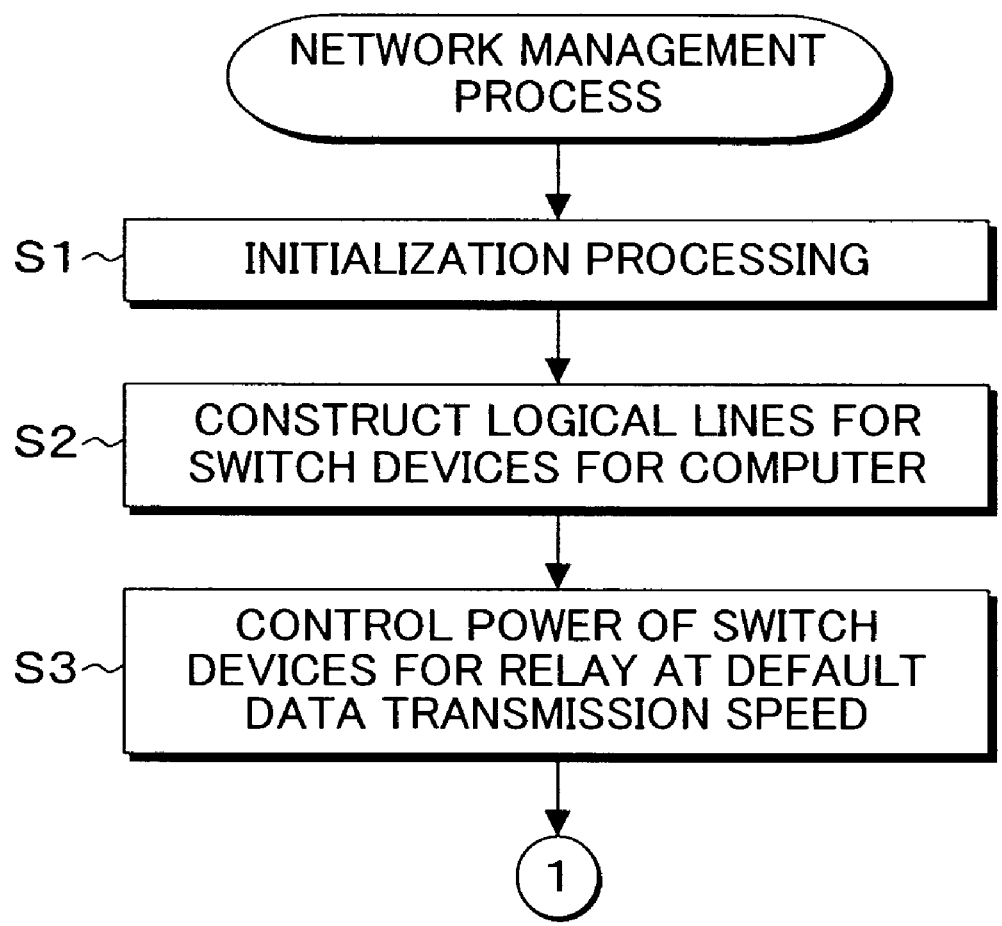
FIGS. 8A and 8B are flow charts of network management process of the present embodiment.
Figure 8B:
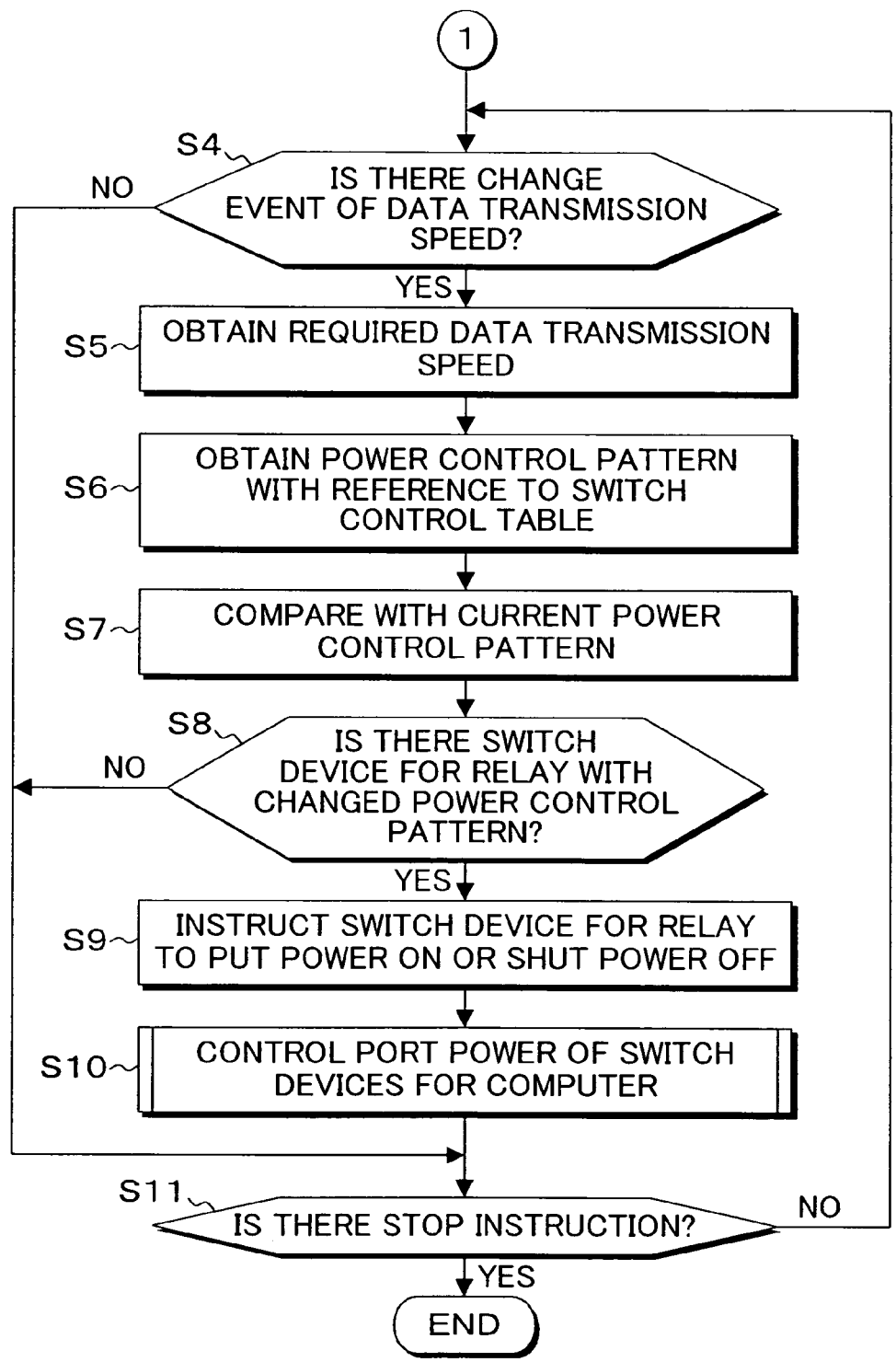

FIGS. 8A and 8B are flow charts of network management process in the present embodiment, and its explanation with reference to FIG. 1 is as follows. In FIGS. 8A and 8B, when power of the network management apparatus 24 is applied, initialization processing is carried out in step S1, followed by constructing the logical lines 18-1 and 18-2 for the switch devices for computer 14-1 and 14-2 in step S2. This construction of the logical lines 18-1 and 18-2 is carried out with reference to the table information prepared in advance that is for binding the physical lines into a logical line. Power control of the switch devices for relay 16-1 and 16-2 is carried out based on a default data transmission speed according to the switch control table 36-1 of FIG. 2 in step S3. For example, a value close to a line transmission speed of 4 Gbps for the logical lines 18-1 and 18-2 is set as the default data transmission speed. Owing to this, according to the power control pattern of the mode 4 of FIG. 3, operation of the interconnection network 10 is confirmed in a state that power is applied to both of the switch devices for relay 16-1 and 16-2. Subsequently, the presence or absence of change event of data transmission speed is checked in step S4. When there is a change event, a required data transmission speed is obtained in step S5, power control patterns for the respective switch devices for relay 16-1 and 16-2 are obtained with reference to the switch control table 36-1 of FIG. 2 in step S6, and the current power control pattern is compared therewith in step S7. According to this comparison, when there is a switch device for relay whose power control pattern has been changed in step S8, power-on or power-off that is the changed power pattern is instructed to the switch device for relay with the power control pattern changed in step S9. Next, port power control of the switch devices for computer 14-1 and 14-2 is carried out in step S10. These procedures from the steps S4 to S10 are repeated until there is a stop instruction.

Figure 9:
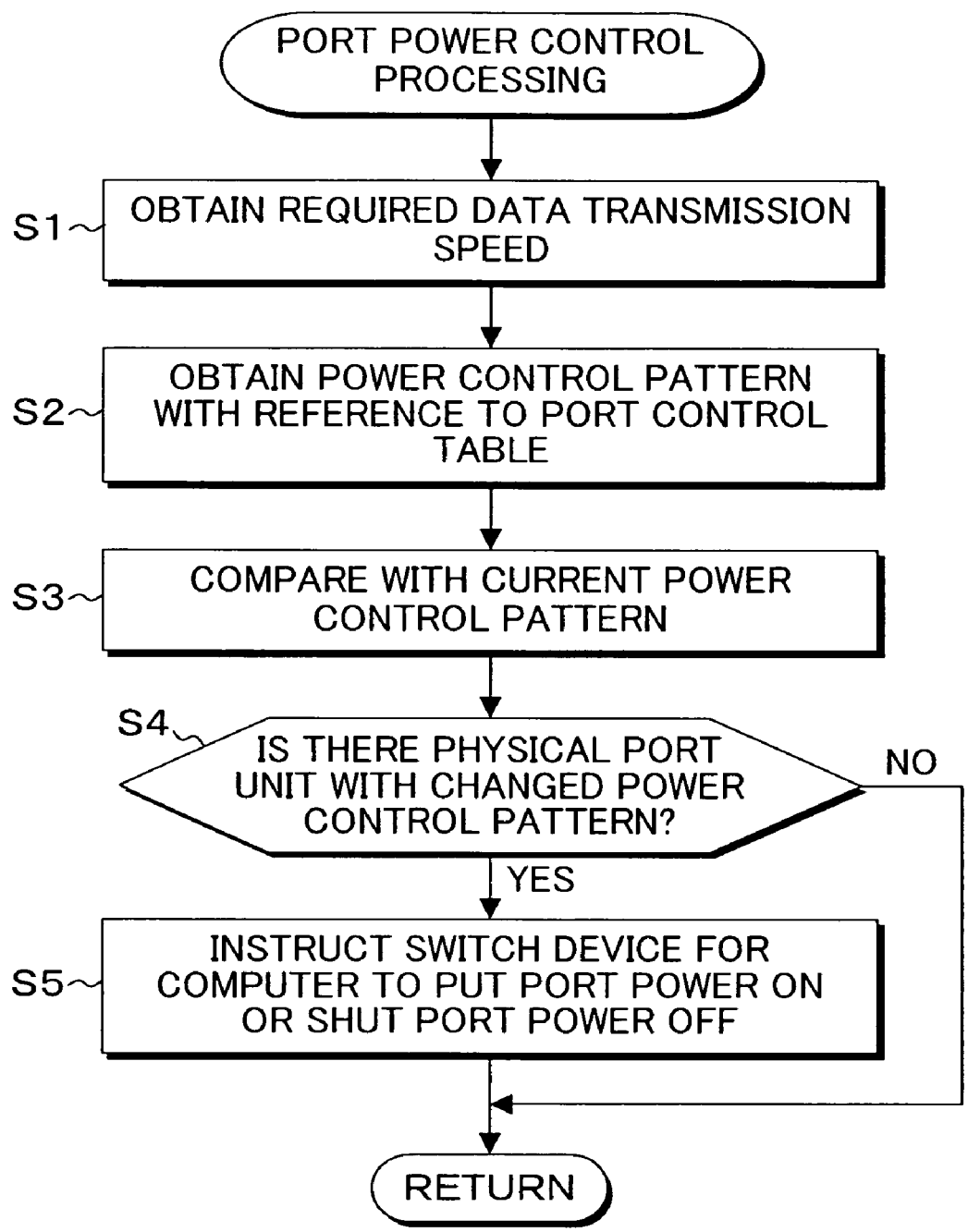
FIG. 9 is a flow chart representing detailed port power control processing in step S10 of FIGS. 8A and 8B.

FIG. 9 is a flow chart representing detailed port power control processing in the step S10 of FIGS. 8A and 8B. In FIG. 9, in the port power control processing, a required data transmission speed is obtained in the step S1, and a power control pattern for the four physical ports P01 to P04 corresponding to any one of the modes 1 to 4 corresponding to the required data transmission speed 100 at the current time is obtained in the step S2 with reference to part of the port control table, that is, part of the switch device for computer 104 in the switch control table 36-1 of FIG. 2. Subsequently, the obtained power control pattern is compared with the current power control pattern for the physical ports P01 to P04 in the step S3, the presence or absence of a physical port unit whose power control pattern has been changed is checked in the step S4. When there is any, the step proceeds to the step S5, and power-on or power-off is instructed to a physical port whose power control pattern has been changed in the switch devices for computer 14-1 and 14-2. It should be noted that it may be good that power of the physical port unit is controlled by sending the power control pattern obtained in the step S2 to the switch device directly without performing the pattern comparison in the steps S3 and S4.

Figure 10A:

FIGS. 10A and 10B are detailed diagrams to explain a parallel computer system representing another embodiment of the present invention. In the embodiment of FIGS. 10A and 10B, the switch devices for computer 14-1 and 14-2 corresponding to the computers 12-1 and 12-2, respectively, are provided between the two computers 12-1 and 12-2 as the interconnection network 10, and the connections between the computers and the switch devices for computers, respectively, are established by logical lines 18-1 and 18-2 each using four physical lines. Four switch devices for relay 16-1 to 16-4 are provided between the switch devices for computer 14-1 and 14-2. Each of the switch devices for relay 16-1 to 16-4 connects one physical line drawn out from each of the switch devices for computer 14-1 and 14-2. That is, the switch device for relay 16-1 connects physical lines 106-1 and 106-2, the switch device for relay 16-2 connects physical lines 106-3 and 106-4, the switch device for relay 16-3 connects physical lines 106-5 and 106-6, and further the switch device for relay 16-4 connects physical lines 106-7 and 106-8 with respect to the respective switch devices for computer 14-1 and 14-2. The interconnection network 10 like this is called clos spreader network, and the number of computers can be an arbitrary number n. The same number of switch devices for computer can be provided corresponding to the number n of the computers, while the number of switch devices for relay is m that corresponds to the number m of physical lines forming logical lines for the switch devices for computer and the computers. In such a clos spreader network as a common form, a case of n=2 and m=4 is shown in the embodiment of FIGS. 10A and 10B. The network management apparatus 24 is provided with respect to the switch devices for computer 14-1 and 14-2 and the switch devices for relay 16-1 to 16-4 of the interconnection network 10. Similarly to the embodiment of FIG. 1, the network management apparatus 24 includes the data transmission speed obtaining unit 30, the switch shutting-off unit 32, the switch resetting unit 34, a switch control table 36-2, and the port power control unit 38. The switch control table 36-2 is provided with the same processing functions as those of the embodiment of FIG. 1 except for having a content that corresponds to the interconnection network 10 of FIGS. 10A and 10B.

FIG. 11 is a detailed diagram to explain the switch control table 36-2 used in the embodiment of FIGS. 10A and 10B. The switch control table 36-2 of FIG. 11 includes the required data transmission speed 100, a switch device for relay 102, and a switch device for computer 104. Since a case is exemplified where the logical lines 18-1 and 18-2 are formed of four physical lines, respectively, and a line transmission speed is set to 1 Gbps per one physical line, the required data transmission speed 100 is divided into the same mode 1 to mode 4 in speed range as in the case of FIG. 2. As shown in the power control patterns for the switch devices for relay 16-1 to 16-4 in this switch control table 36-2, power is sequentially turned on in the order from the switch device for relay 16-1 to 16-4 as the required data transmission speed is gradually increased corresponding to the number of the physical lines. In contrast, when the required data transmission speed is reduced, power of the switch devices for relay 16-1 to 16-4 is sequentially turned off according to the reverse order to that in the case of the increase. Further, in correspondence to the modes 1 to 4, power control patterns for the four physical ports P01 to P04 and the mode 1 to mode 4 are set with respect to the switch devices for computer 14-1 and 14-2 as in the case of FIG. 2.

Figure 12:
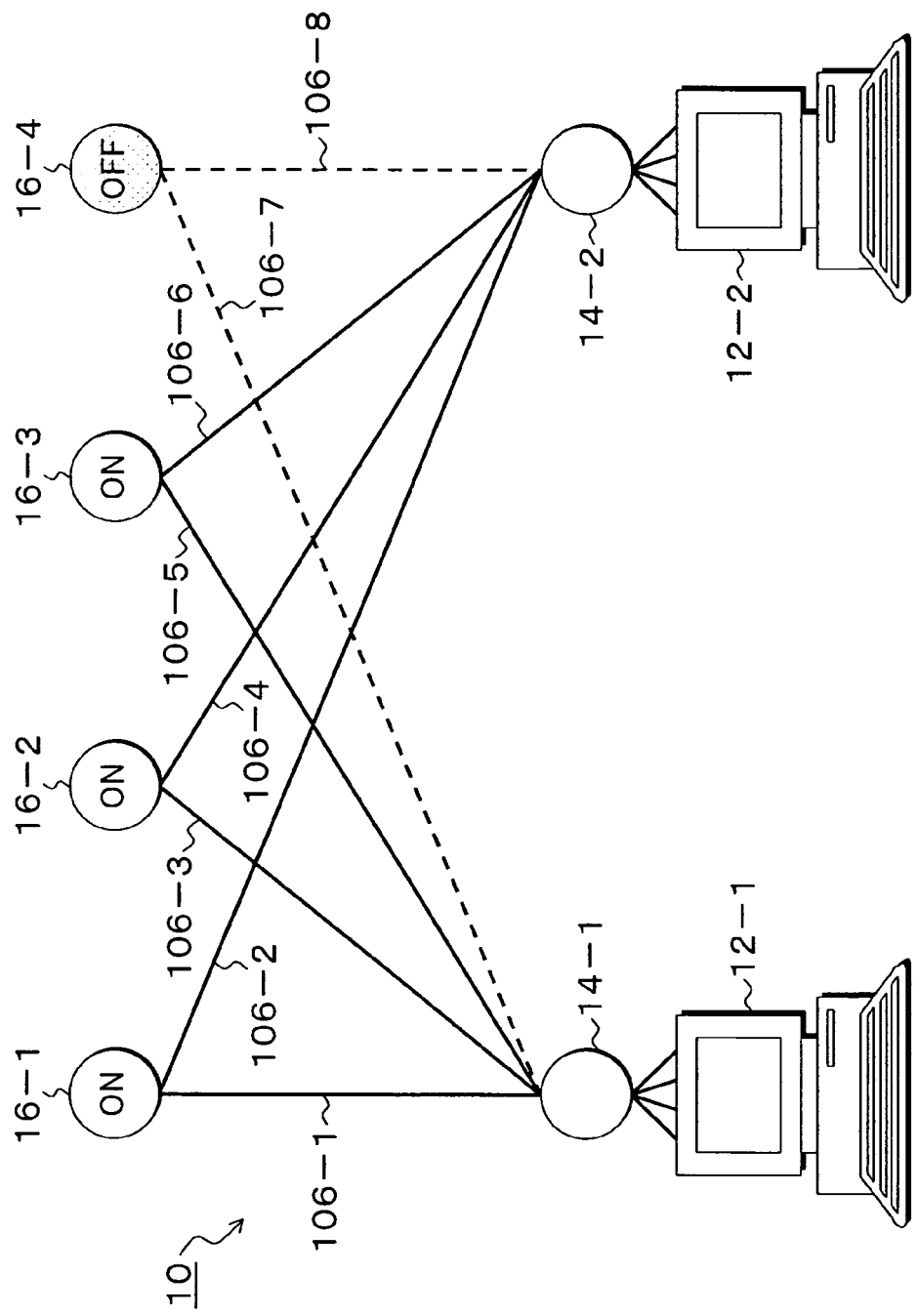
FIG. 12 is a detailed diagram to explain a case where power of one switch device for relay is turned off in the embodiment of FIGS. 10A and 10B.

FIG. 12 is a detailed diagram to explain a case where power of one switch device for relay is turned off in the embodiment of FIGS. 10A and 10B. In FIG. 12, a case where the data transmission speed required for the computers 12-1 and 12-2 is 2 Gbps or higher but lower than 3 Gbps, that is, the mode 3, is shown. In this case, power of the switch device for relay 16-4 is turned off to shut it off from the interconnection network 10, and the line transmission speed between the computers 12-1 and 12-2 is set to 3 Gbps that corresponds to three physical lines. Of course, the switch devices for computer 14-1 and 14-2 disable physical lines 106-7 and 106-8 connecting to the switch device for relay 16-4 whose power is shut off by turning off the power supply to the physical ports connecting the physical lines 106-7 and 106-8. This disabling is also carried out to the physical port units with one physical line on the sides of the computers 12-1 and 12-2, respectively, and the power consumption in the interconnection network 10 is reduced by adding the power-off of the physical port units in the switch devices for computer 14-1 and 14-2 to the power-off of the switch device for relay 16-4.

Figure 13:
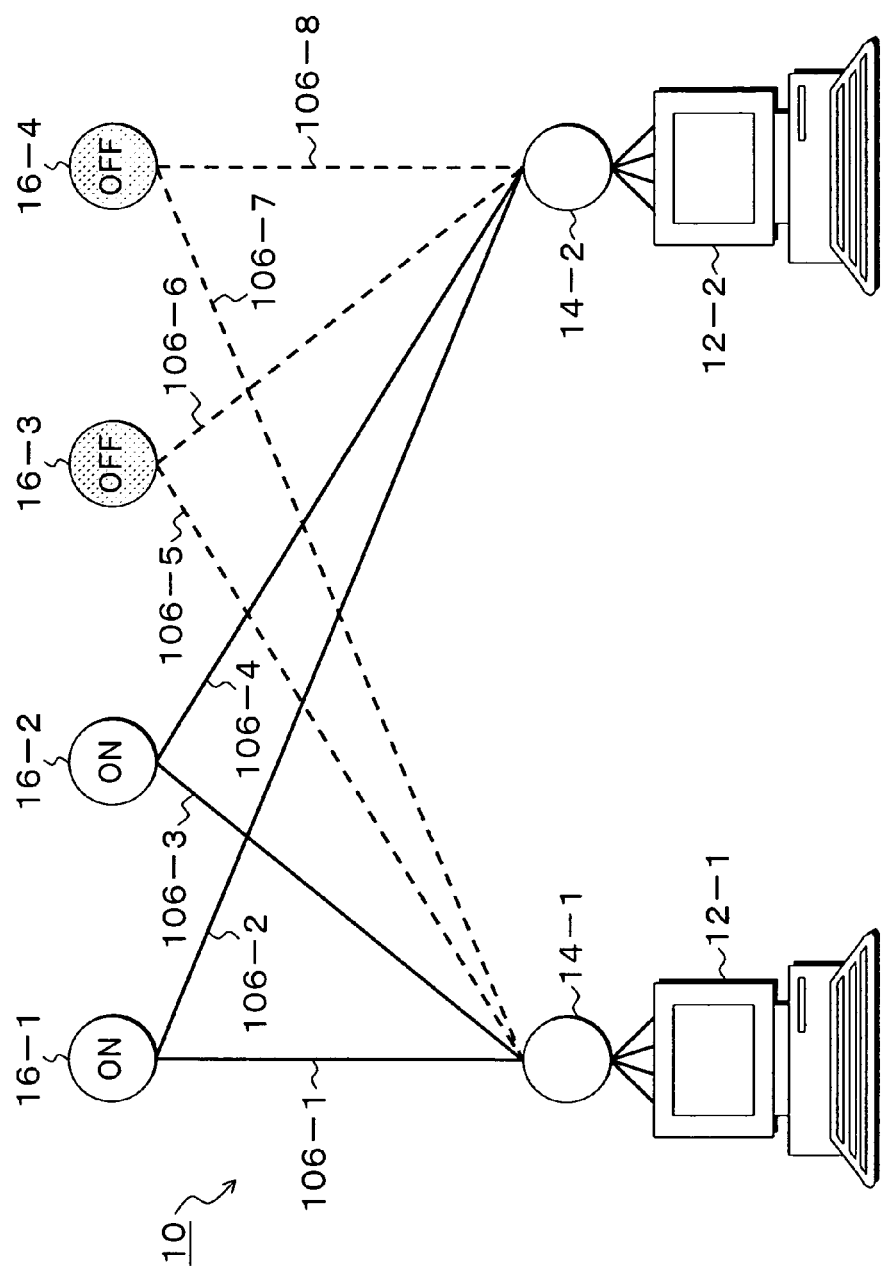
FIG. 13 is a detailed diagram to explain a case where power of two switch devices for relay is turned off in the embodiment of FIGS. 10A and 10B.

FIG. 13 is a detailed diagram to explain a case where power of two switch devices for relay is turned off in the embodiment of FIGS. 10A and 10B and where the required data transmission speed is 1 Gbps or higher but lower than 2 Gbps as represented by the mode 2 in the switch control table 36-2 of FIG. 11.

Figure 14:
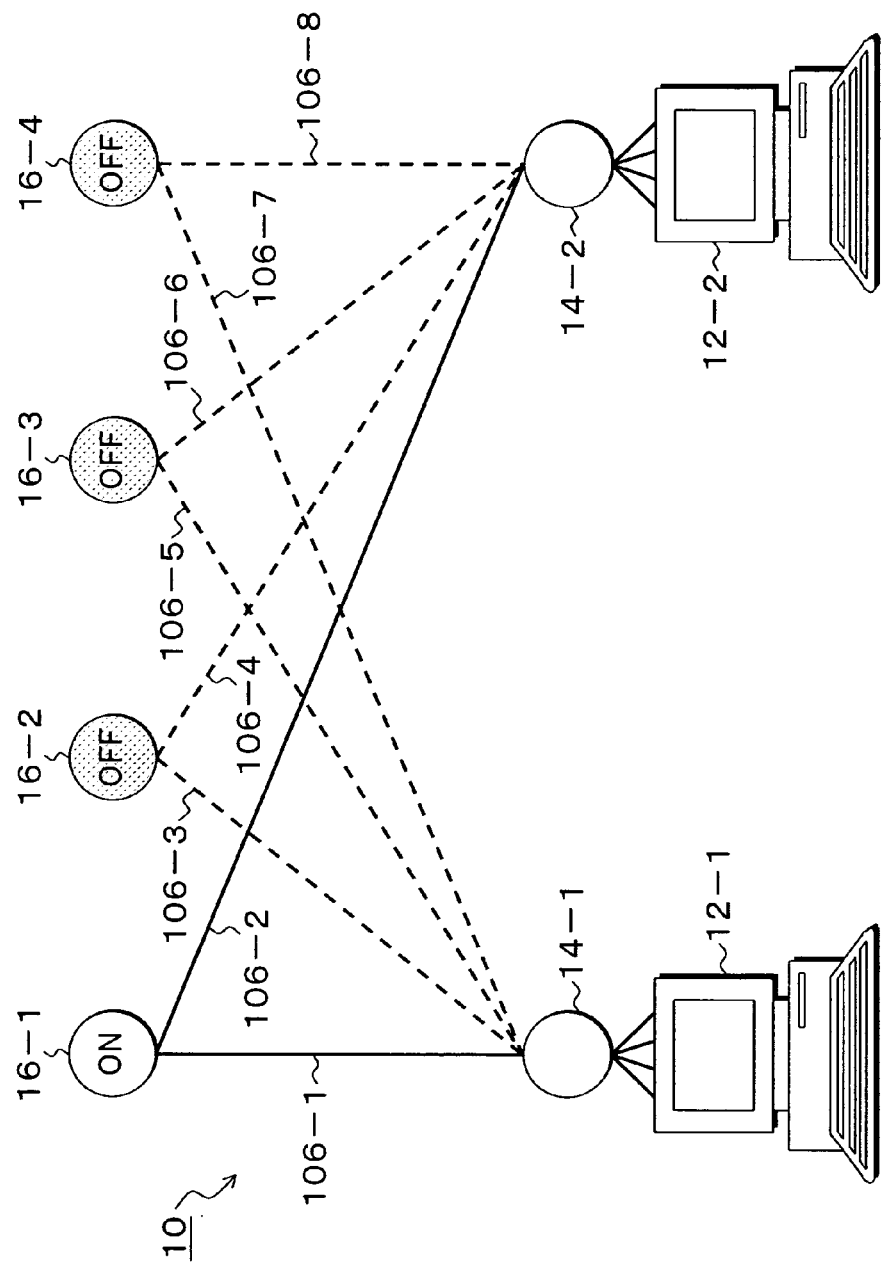
FIG. 14 is a detailed diagram to explain a case where power of three switch devices for relay is turned off in the embodiment of FIGS. 10A and 10B.

FIG. 14 is a detailed diagram to explain a case where power of three switch devices for relay is turned off in the embodiment of FIGS. 10A and 10B and where the required data transmission speed is lower than 1 Gbps as represented by the mode 1 of FIG. 11.

Figure 15A:
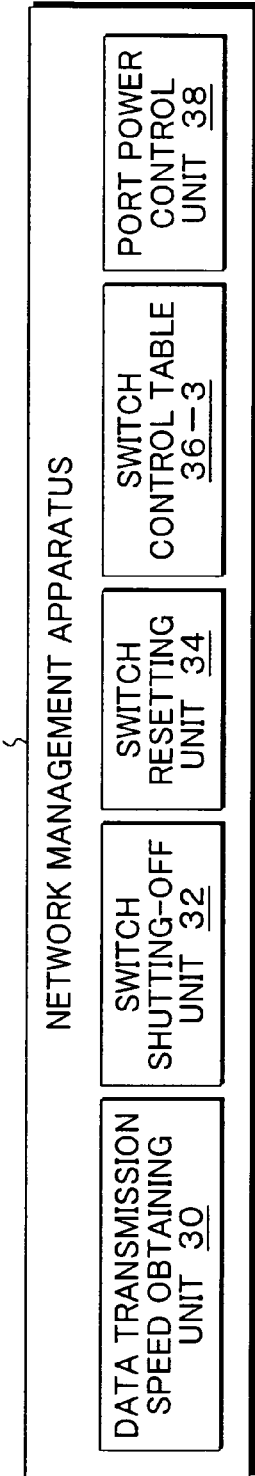
FIGS. 15A and 15B are detailed diagrams to explain the parallel computer system representing still another embodiment of the present invention.
Figure 15B:
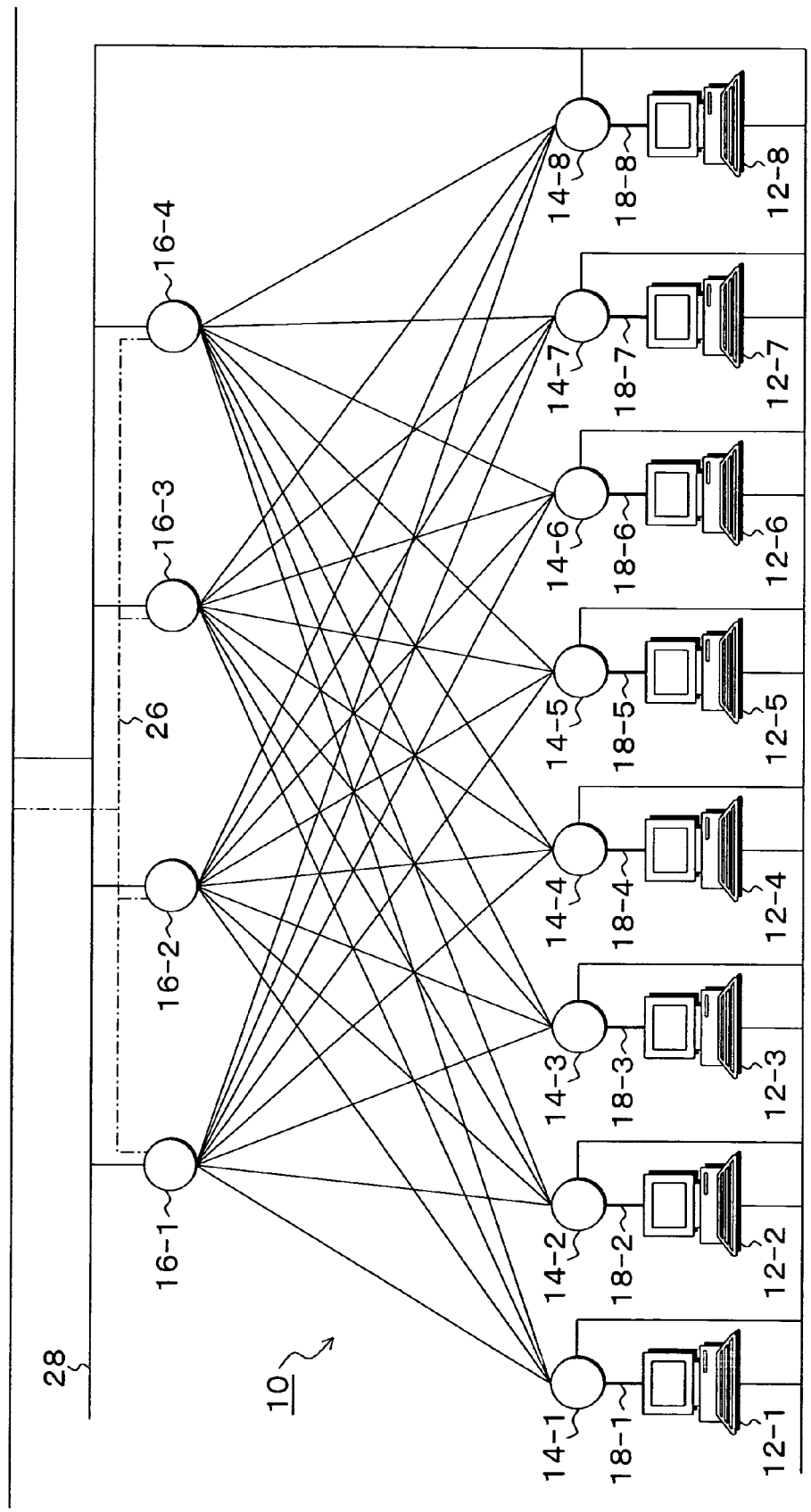

FIGS. 15A and 15B are detailed diagrams to explain a parallel computer system representing still another embodiment of the present embodiment. In this embodiment, a case is shown where the number n of computers is set to n=8 and the number m of physical lines forming the logical line is set to m=4 in the interconnection network 10 constructing the same clos spreader network as in FIGS. 10A and 10B. For this, the switch devices for computer 14-1 to 14-8 are connected to eight computers 12-1 to 12-8 via the logical lines 18-1 to 18-8 each formed of four physical lines, four switch devices for relay 16-1 to 16-4 are arranged as switch devices for relay that interconnect the switch devices for computer, and a connection structure of clos spreader network is realized between the eight switch devices for computer 14-1 to 14-8 and the four switch devices for relay 16-1 to 16-4 via the physical lines. With respect to such interconnection network 10, the network management apparatus 24 is provided, and the network management apparatus 24 is provided with functions of the data transmission speed obtaining unit 30, the switch shutting-off unit 32, the switch resetting unit 34, a switch control table 36-3, and the port power control unit 38. Further, the network management apparatus 24 connects the power line 26 through which power-on or off is carried out individually with respect to the switch devices for relay 16-1 to 16-4 and further connects the switch devices for relay 16-1 to 16-4 and the switch devices for computer 14-1 to 14-8 via a local area network (LAN) 28. The functions of the network management apparatus 24 are the same as those of FIG. 1 except for the switch control table 36-3 that corresponds to the interconnection network 10 of FIGS. 15A and 15B.

FIG. 16 is a detailed diagram to explain the switch control table 36-3 used in the embodiment of FIGS. 15A and 15B. The switch control table 36-3 is the same as that of the switch control table 36-2 of FIG. 11 except for addition of port power control patterns for the physical ports P01 to P04 for six computers 12-3 to 12-8 that are newly added to the switch control table 36-2 of FIG. 11 in the embodiment of FIGS. 10A and 10B. Here, FIGS. 15A and 15B correspond to a case where power of all the switch devices for relay 16-1 to 16-4 is turned on and where the required data transmission speed is 3 Gbps or higher, that is, the mode 4 in the switch control table 36-3 of FIG. 16.

Figure 17:
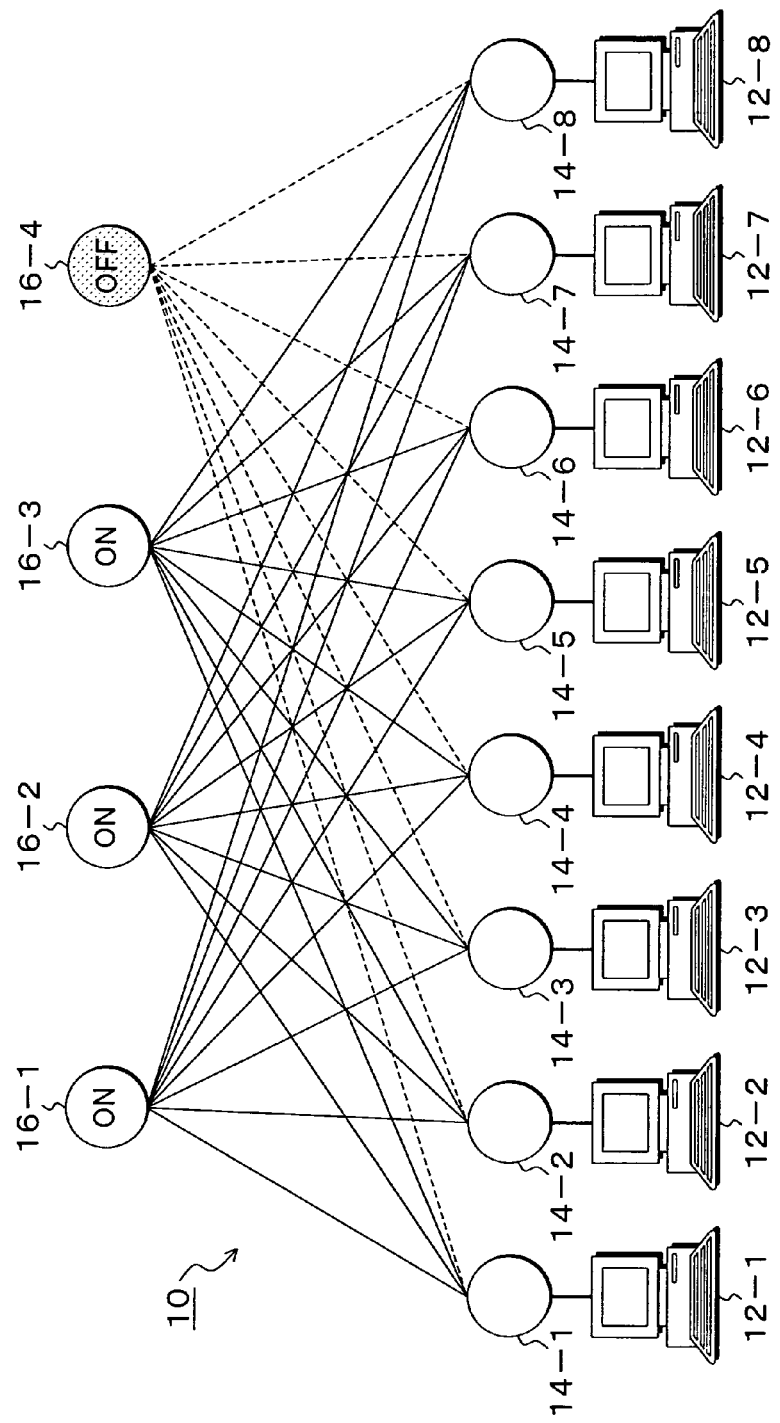
FIG. 17 is a detailed diagram to explain a case where power of one switch device for relay is turned off in the embodiment of FIGS. 15A and 15B.

FIG. 17 is a detailed diagram to explain a case where power of one switch device for relay is turned off in the embodiment of FIGS. 15A and 15B and where the required data transmission speed is 2 Gbps or higher but lower than 3 Gbps, that is, the mode 3 in the switch control table 36-3 of FIG. 16. In this case, the switch device for relay 16-4 is shut off from the interconnection network 10 by power-off. At the same time, in the switch devices for computer 14-1 to 14-8, power of the physical port units corresponding to the physical lines connecting to the switch device for relay 16-4 that has been shut off by power-off is turned off. This disabling of one physical line by power-off of the physical port units is similarly carried out with respect to the logical lines connecting to the computers 12-1 to 12-8.

Figure 18:
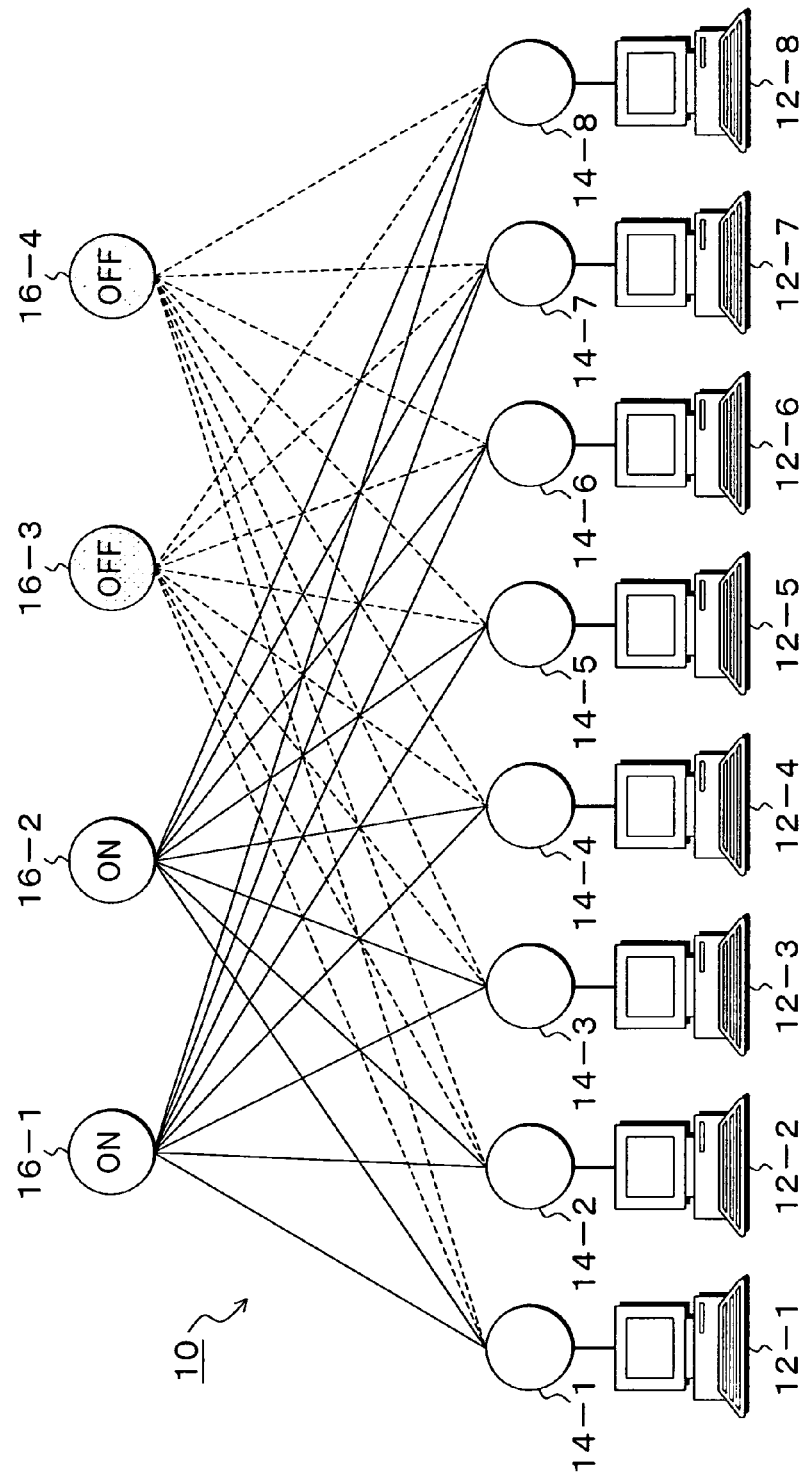
FIG. 18 is a detailed diagram to explain a case where power of two switch devices for relay is turned off in the embodiment of FIGS. 15A and 15B.

FIG. 18 is a detailed diagram to explain a case where power of two switch devices for relay is turned off in the embodiment of FIGS. 15A and 15B and where the required data transmission speed is 1 Gbps or higher but lower than 2 Gbps, that is, the mode 2 in the switch control table 36-3 of FIG. 16, and power of the switch devices for relay 16-3 and 16-4 is turned off to shut them off from the interconnection network 10. At the same time, in the switch devices for computer 14-1 to 14-8, disabling of two physical lines each connecting to the switch devices for relay 16-3 and 16-4 that have been shut off by power-off is carried out by power-off of the physical port units. This disabling of the two physical lines by power-off of the physical port units is similarly carried out with respect to the logical lines connecting to the computers 12-1 to 12-8.

Figure 19:
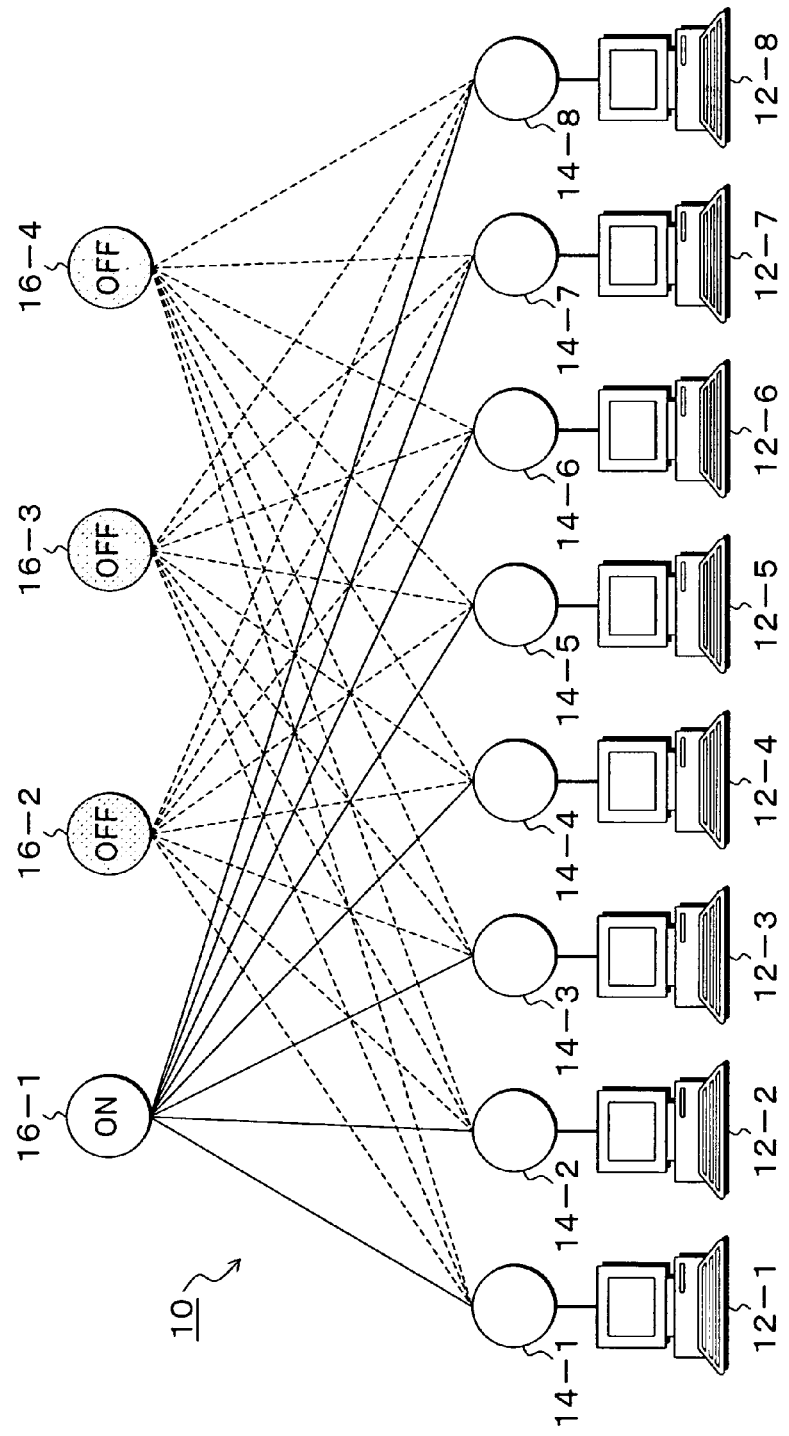
FIG. 19 a detailed diagram to explain a case where power of three switch devices for relay is turned off in the embodiment of FIGS. 15A and 15B.

FIG. 19 is a detailed diagram to explain a case where power of three switch devices for relay is turned off in the embodiment of FIGS. 15A and 15B. This is a case where the required data transmission speed is lower than 1 Gbps, that is, the mode 1 in the switch control table 36-3 of FIG. 16, and three switch devices for relay 16-2, 16-3, and 16-4 are shut off from the interconnection network 10 by the power-off. At the same time, in the switch devices for computer 14-1 to 14-8, disabling of the physical lines is carried out by power-off of the physical port units corresponding to three physical lines that are interconnected among the switch devices for relay 16-2, 16-3, and 16-4 that have been shut off by power-off, and this disabling of the physical lines is similarly carried out on the sides of the logical lines connecting the computers 12-1 to 12-8. Here, FIGS. 15A, 15B and FIGS. 17 to 19 represent power-off of the switch devices for relay in a case where the required data transmission speed is gradually reduced. When the required data transmission speed is getting increased in a state that the three switch devices for relay 16-2 to 16-4 of FIG. 19 are shut off, the switch devices for relay being shut off are allowed to be reset by power-on in the order of FIG. 18, FIG. 17, and FIGS. 15A and 15B that is the reverse order of the power-off. Further, the present invention provides a program executed by the network management apparatus 24 that monitors the interconnection network 10 constructing a parallel computer system, and this program has the contents shown in the flow charts of FIGS. 8A, 8B and FIG. 9.

Furthermore, the present invention provides a record medium storing the program that is executed by the network management apparatus. This record medium includes other computer systems and database, in addition to compact disk (CD)-ROM, floppy (R) disk, digital video disc (DVD), magneto-optic disk, card type recording media such as integrated circuit (IC) card, and memory such as hard disk drive that is provided inside or outside a computer system.

Note that the present invention is not limited to the network structure of the interconnection network shown in the above embodiments, and as long as a network interconnects a plurality of computers via switch devices therebetween, it can be applied to any appropriate network structure. Further, the present invention is not limited to the above embodiments but includes appropriate modifications that do not impair its objects and advantages, and further is not limited by the numerical values shown in the above embodiments.

What is claimed is:

1. A network management method that manages an interconnection network of a parallel computer system in which switch devices for computer are provided to a plurality of computers, respectively, a predetermined number of physical lines for the switch device for computer are bound to form a logical line, and the physical lines forming the logical line interconnect the other switch devices for computer via a plurality of switch devices for relay, the network management method comprising:

a data transmission speed obtaining step in which a data transmission speed required among the computers is obtained;

a switch shutting-off step in which, when the data transmission speed required among the computers is judged to be lower than a line transmission speed determined by the number of physical lines for any switch device for relay, power of the whole switch device for relay that has been judged is turned off to shut off the switch device for relay from the interconnection network; and a switch resetting step in which, when a data transmission speed after the shutting-off is judged to be higher than the line transmission speed determined by the number of physical lines for the switch device for relay in the shutting-off state, power of the whole switch device for relay in the shutting-off state is turned on to allow the switch device for relay to return to the interconnection network.

2. The network management method according to claim 1, wherein in the interconnection network, when the predetermined number of the physical lines forming the logical line for the switch device for computer is divided into half and the physical lines connect to each other via switch devices for relay respectively, in the switch shutting-off step, when a data transmission speed required between the computers is judged to be lower than a line transmission speed determined by the half number of physical lines for either switch device for relay, power of the whole switch device for relay that has been judged is turned off to shut off the switch device for relay from the interconnection network, and in the switch resetting step, when a data transmission speed required between the computers after the shutting-off is judged to be higher than the line transmission speed determined by the half number of the physical lines for a plurality of switch devices for relay, power of the whole switch device for relay in the shutting-off state is turned on to allow the switch device for relay to return to the interconnection network.

3. The network management method according to claim 1, wherein in the interconnection network, when each logical line for the number n of switch devices for computer provided corresponding to the computers is formed of the number m of physical lines and the number n of the switch devices for computer are interconnected via the number m of switch devices for relay whose number corresponds to the number m of the physical lines forming each of the logical lines, in the switch shutting-off step, every time when a data transmission speed required among the computers is judged to be lower than a line transmission speed for one line of the physical lines, power of the number m of the whole switch devices for relay each provided for every physical line is turned off according to a predetermined priority order to shut off the switch devices for relay from the interconnection network, and in the switch resetting step, every time when a data transmission speed required among the computers after the shutting-off is judged to be higher than the line transmission speed for one line of the physical lines, power of the whole switch devices for relay in the shutting-off state is turned on according to the reverse order to the priority order to allow the switch devices for relay to return to the interconnection network.

4. The network management method according to claim 1, wherein in the interconnection network, when each logical line for two switch devices for computer provided corresponding to the computers is formed of four physical lines and the two switch devices for computer are interconnected via four switch devices for relay whose number corresponds to the number four of physical lines forming each of the logical lines, in the switch shutting-off step, every time when a data transmission speed required between the computers is judged to be lower than a line transmission speed for one line of the physical lines, power of the four whole switch devices for relay each provided for every physical line is turned off according to a predetermined priority order to shut off the switch devices for relay from the interconnecting network, and in the switch resetting step, every time when a data transmission speed required among the computers after the shutting-off is judged to be higher than the line transmission speed for one line of the physical lines, power of the whole switch devices in the shutting-off state is turned on according to the reverse order to the priority order to allow the switch devices for relay to return to the interconnection network.

5. The network management method according to claim 1, wherein in the interconnection network, when each logical line for eight switch devices for computer provided corresponding to the computers is formed of four physical lines and the eight switch devices for computer are interconnected via four switch devices for relay whose number corresponds to the number four of physical lines forming each of the logical lines, in the switch shutting-off step, every time when a data transmission speed required between the computers is judged to be lower than a line transmission speed for one line of the physical lines, power of the four whole switch devices for relay each provided for every physical line is turned off according to a predetermined priority order to shut off the switch devices for relay from the interconnecting network, and in the switch resetting step, every time when a data transmission speed required among the computers after the shutting-off is judged to be higher than the line transmission speed for one line of the physical lines, power of the whole switch devices in the shutting-off state is turned on according to the reverse order to the priority order to allow the switch devices for relay to return to the interconnection network.

6. The network management method according to claim 3, wherein in the switch resetting step, power of a shared processing unit except for physical port units is preliminarily turned on with respect to a switch device for relay whose power is to be turned on next among the switch devices for relay being shut off and when a data transmission speed required among the computers is judged to be higher than the line transmission speed for one line of the physical lines, power of the whole of the physical port units of the switch device for relay in which power of the shared processing unit has preliminarily been turned on is turned on to allow the switch device for relay to return to the interconnection network.

7. The network management method according to claim 1, wherein a port power control step in which a plurality of physical port units connecting the physical lines that form the logical lines for the switch devices for computer are enabled or disabled by individual power-on or power-off to change the line transmission speed to a line transmission speed corresponding to a data transmission speed required among the computers is further provided.

8. The network management method according to claim 1, wherein the port power control step includes a port disabling step in which every time when a data transmission speed required among the computers is judged to be lower than a line transmission speed for one line of the physical lines, power of physical port units each provided for every physical line is turned off according to a predetermined priority order for disabling; and a port enabling step in which every time when a data transmission speed required among the computers is judge to be higher than the line transmission speed for one line of the physical lines, power of the physical port units being disabled is turned on according to the reverse order to the priority order for enabling.

9. The network management method according to claim 1, wherein in the data transmission speed obtaining step, a data transmission speed for the logical line for the switch device for computer is detected as a data transmission speed required among the computers.

10. The network management method according to claim 1, wherein in the data transmission speed obtaining step, a data transmission speed required among the computers is obtained from an estimated time schedule for data transmission speed created from the communication history that has been stored by detecting data transmission speeds for the logical lines for switch devices for computer.

11. A computer-readable storage medium which stores a network management program for a computer of a network management apparatus that manages an interconnection network of a parallel computer system in which switch devices for computer are provided to a plurality of computers, respectively, a logical line is formed by binding a predetermined number of physical lines for the switch device for computer, and the physical lines forming the logical line interconnect the other switch devices for computer via a plurality of switch devices for relay, the network management program comprising executing:

a data transmission speed obtaining step in which a data transmission speed required among the computers is obtained;

a switch shutting-off step in which, when the data transmission speed required among the computers is judged to be lower than a line transmission speed determined by the number of physical lines for any switch device for relay, power of the whole switch device for relay that has been judged is turned off to shut off the switch device for relay from the interconnection network; and a switch resetting step in which, when a data transmission speed after the shutting-off is judged to be higher than the line transmission speed determined by the number of the physical lines for the switch device for relay in the shutting-off state, power of the whole switch device for relay in the shutting-off state is turned on to allow the switch device for relay to return to the interconnection network.

12. The storage medium according to claim 11, wherein in the interconnection network, when the predetermined number of the physical lines forming the logical line for the switch device for computer is divided into half and the physical lines connect to each other via switch devices for relay respectively, in the switch shutting-off step, when a data transmission speed required between the computers is judged to be lower than a line transmission speed determined by the half number of the physical lines for either switch device for relay, power of the whole switch device for relay that has been judged is turned off to shut off the switch device for relay from the interconnection network, and in the switch resetting step, when a data transmission speed required between the computers after the shutting-off is judged to be higher than the line transmission speed determined by the half number of the physical lines for a plurality of the switch devices for relay, power of the whole switch device for relay in the shutting-off state is turned on to allow the switch device for relay to return to the interconnection network.

13. The storage medium according to claim 11, wherein, in the interconnection network, when each of logical lines for the number n of switch devices for computers provided corresponding to the computers is formed of the number m of lines of physical lines and the number n of the switch devices for computer are interconnected via the number m of switch devices for relay whose number corresponds to the number m of the physical lines forming each of the logical lines, the network management method characterized in that in the switch shutting-off step, every time when a data transmission speed required among the computers is judged to be lower than a line transmission speed for one line of the physical lines, power of the number m of the whole switch devices for relay each provided for every physical line is turned off according to a predetermined priority order to shut off the switch devices for relay from the interconnection network and that in the switch resetting step, every time when a data transmission speed required among the computers after the shutting-off is judged to be higher than the line transmission speed for one line of the physical lines, power of the whole switch devices for relay in the shutting-off state is turned on according to the reverse order to the priority order to allow the switch devices for relay to return to the interconnection network.

14. The storage medium according to claim 13, wherein in the switch resetting step, power of a shared processing unit except for physical port units is preliminarily turned on with respect to a switch device for relay whose power is to be turned on next among the switch devices for relay being disabled and when a data transmission speed required among the computers is judged to be higher than the line transmission speed for one line of the physical lines, power of the whole of the physical port units of the switch device for relay in which power of the shared processing unit has preliminarily been on is turned on to allow the switch device for relay to return to the interconnection network.

15. The storage medium according to claim 11, wherein a port power control step in which a plurality of physical port units connecting the physical lines that form the logical lines for the switch devices for computer are enabled or disabled by individual power-on or power-off to change the line transmission speed to a line transmission speed corresponding to a data transmission speed required among the computer is further provided.

16. The according to claim 11, wherein the port power control step includes a port disabling step in which, every time when a data transmission speed required among the computers is judged to be lower than a line transmission speed for one line of the physical lines, power of the physical port units each provided for every physical line is turned off according to a predetermined priority order for disabling; and a port enabling step in which, every time when a data transmission speed required among the computers is judged to be higher than the line transmission speed for one line of the physical lines, power of the physical ports being disabled is turned on according to the reverse order to the priority order for enabling.

17. A network management system comprising:
an interconnection network of a parallel computer system in which switch devices for computer are provided to a plurality of computers, respectively, each logical line is formed by binding a predetermined number of physical lines for the switch device for computer, and the physical lines forming the logical line interconnect the other switch devices for computer via a plurality of switch devices for relay; and a network management apparatus that manages the interconnection network, wherein the network management apparatus is provided with a data transmission speed obtaining unit that obtains a data transmission speed required among the computers; a switch shutting-off unit that turns off power of a whole switch device for relay that has been judged to shut off the switch device for relay from the interconnection network when the data transmission speed required among the computers is judged to be lower than a line transmission speed determined by the number of physical lines for any switch device for relay; and a switch resetting unit that turns on power of the whole switch device for relay in the shutting-off state to allow the switch device for relay to return to the interconnection network when a data transmission speed after the shutting-off is judged to be higher than the line transmission speed determined by the number of the physical lines for the switch device for relay in the shutting-off state.

18. The network management system according to claim 17, wherein in the interconnection network, when a predetermined number of the physical lines forming the logical line for the switch device for computer is divided into half and the physical lines connect to each other via switch devices for relay respectively, the switch shutting-off unit turns off power of a whole switch device for relay that has been judged to shut off the switch device for relay from the interconnection network when a data transmission speed required among the computers is judged to be lower than a line transmission speed determined by the half number of the physical lines for any switch devices for relay; and the switch resetting unit turns on power of the whole switch device for relay in the shutting-off state to allow the switch device for relay to return to the interconnection network when a data transmission speed required among the computers after the shutting-off is judged to be higher than the line transmission speed determined by the half number of the physical lines for a plurality of the switch devices for relay.

19. The network management system according to claim 17, wherein in the interconnection network, when each of logical lines for the number n of switch devices for computers provided corresponding to the computers is formed of the number m of lines of physical lines and the number n of the switch devices for computer are interconnected via the number m of switch devices for relay whose number corresponds to the number m of the physical lines forming the logical lines, the switch shutting-off unit turns off power of the number m of the whole switch devices for relay each provided for every physical line according to a predetermined priority order to shut off the switch devices for relay from the interconnection network every time when a data transmission speed required among the computers is judged to be lower than a line transmission speed for one line of the physical lines; and the switch resetting unit turns on power of the whole switch devices for relay in the shutting-off state according to the reverse order to the priority order to allow the switch devices for relay to return to the interconnection network every time when a data transmission speed required among the computers after the shutting-off is judged to be higher than the line transmission speed for one line of the physical lines.

20. The network management system according to claim 18, wherein, the switch resetting unit preliminarily turns on power of a shared processing unit except for physical port units with respect to a switch device for relay whose power is to be turned on next among the switch devices for relay being disabled and when a data transmission speed required among the computers is judged to be higher than the line transmission speed for one line of the physical lines, the switch resetting unit turns on power of the whole of the physical port units of the switch device for relay in which power of the shared processing unit has preliminarily been turned on to allow the switch device for relay to return to the interconnection network.

* * * * *

UNITED STATES PATENT AND TRADEMARK OFFICE
CERTIFICATE OF CORRECTION

| | |
|---|---|
| PATENT NO. | : 7,653,738 B2 |
| APPLICATION NO. | : 11/476650 |
| DATED | : January 26, 2010 |
| INVENTOR(S) | : Yoshiro Ikeda et al. |

It is certified that error appears in the above-identified patent and that said Letters Patent is hereby corrected as shown below:

Column 18, Line 5, change "wherein," to --wherein--.

Column 18, Line 50, after "The" insert --storage medium--.

Column 20, Line 31, change "wherein," to --wherein--.

Signed and Sealed this

First Day of June, 2010

David J. Kappos
*Director of the United States Patent and Trademark Office*